(12) United States Patent
Fukukawa et al.

(10) Patent No.: US 6,691,542 B2
(45) Date of Patent: Feb. 17, 2004

(54) METHOD AND APPARATUS FOR MANUFACTURING A CYLINDRICAL MEMBER, AND CYLINDRICAL MEMBER HAVING SPLINES

(75) Inventors: Osamu Fukukawa, Anjo (JP); Masaki Nakajima, Anjo (JP); Hideyuki Nagai, Anjo (JP); Takehiko Adachi, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/956,263

(22) Filed: Sep. 20, 2001

(65) Prior Publication Data

US 2002/0040835 A1 Apr. 11, 2002

(30) Foreign Application Priority Data

Sep. 26, 2000 (JP) ........................................ 2000-292977
Jul. 6, 2001 (JP) ........................................ 2001-207101

(51) Int. Cl.[7] ............................................... B21D 22/00
(52) U.S. Cl. ............................................... 72/84; 72/85
(58) Field of Search ............................... 72/82, 83, 84, 72/85

(56) References Cited

U.S. PATENT DOCUMENTS 5,718,311 A    2/1998  Victoria et al. ............ 192/3.28
5,931,037 A  * 8/1999  Yamada et al. ................. 72/85
5,947,853 A  * 9/1999  Hodjat et al. ................ 474/166
5,951,422 A  * 9/1999  Roes et al. ..................... 474/94

FOREIGN PATENT DOCUMENTS

| DE | 293281 | * 8/1991 | ................ 72/83 |
| JP | 59-193724 | * 11/1984 | ................ 72/83 |
| JP | 5-76982 | * 3/1993 | ................ 72/83 |
| JP | 9-317848 | 12/1997 | |
| JP | 2001-25825 | 1/2001 | |

* cited by examiner

Primary Examiner—Ed Tolan
(74) Attorney, Agent, or Firm—Lorusso, Loud & Kelly

(57) ABSTRACT

Excessive increase in processing loads and damages to a thickening roller resulting from pressing the thickening roller against the blank from the outer peripheral end face are prevented, and processing of a cylindrical member having an enlarged diameter portion is made possible. With the side surface of an intermediate portion of a blank abutting and being supported on an increased diameter portion of a mandrel, a thickening roller is pressed against the side surface of the intermediate portion and moved in the radially inward direction. The blank is thus partially thickened, and the thickened portion is pressed into tooth spaces formed in a columnar portion of the mandrel, whereby splines are formed.

24 Claims, 29 Drawing Sheets

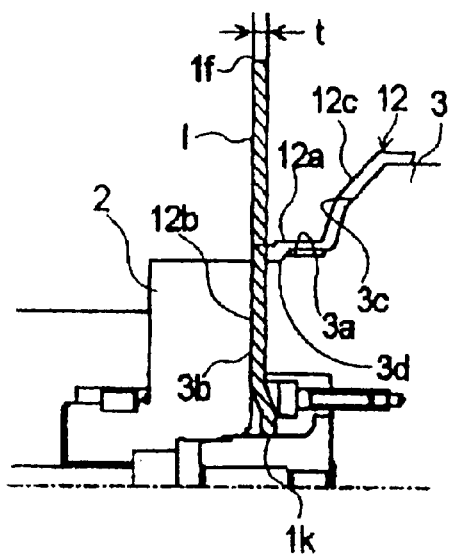
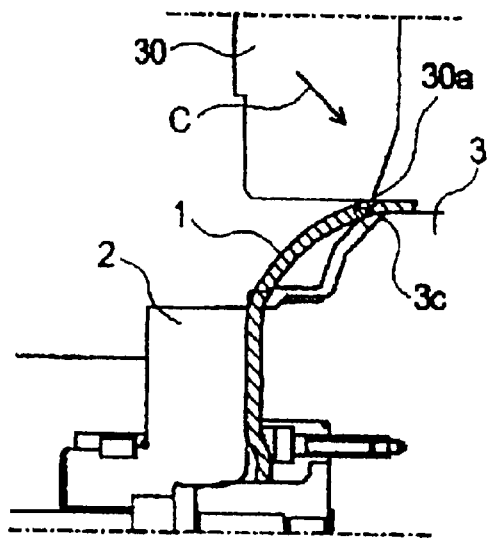
FIG. 1(a)    FIG. 1(b)
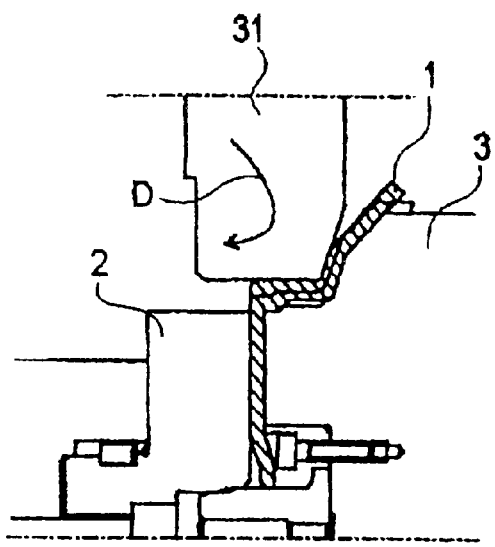
FIG. 1(c)

F I G. 7
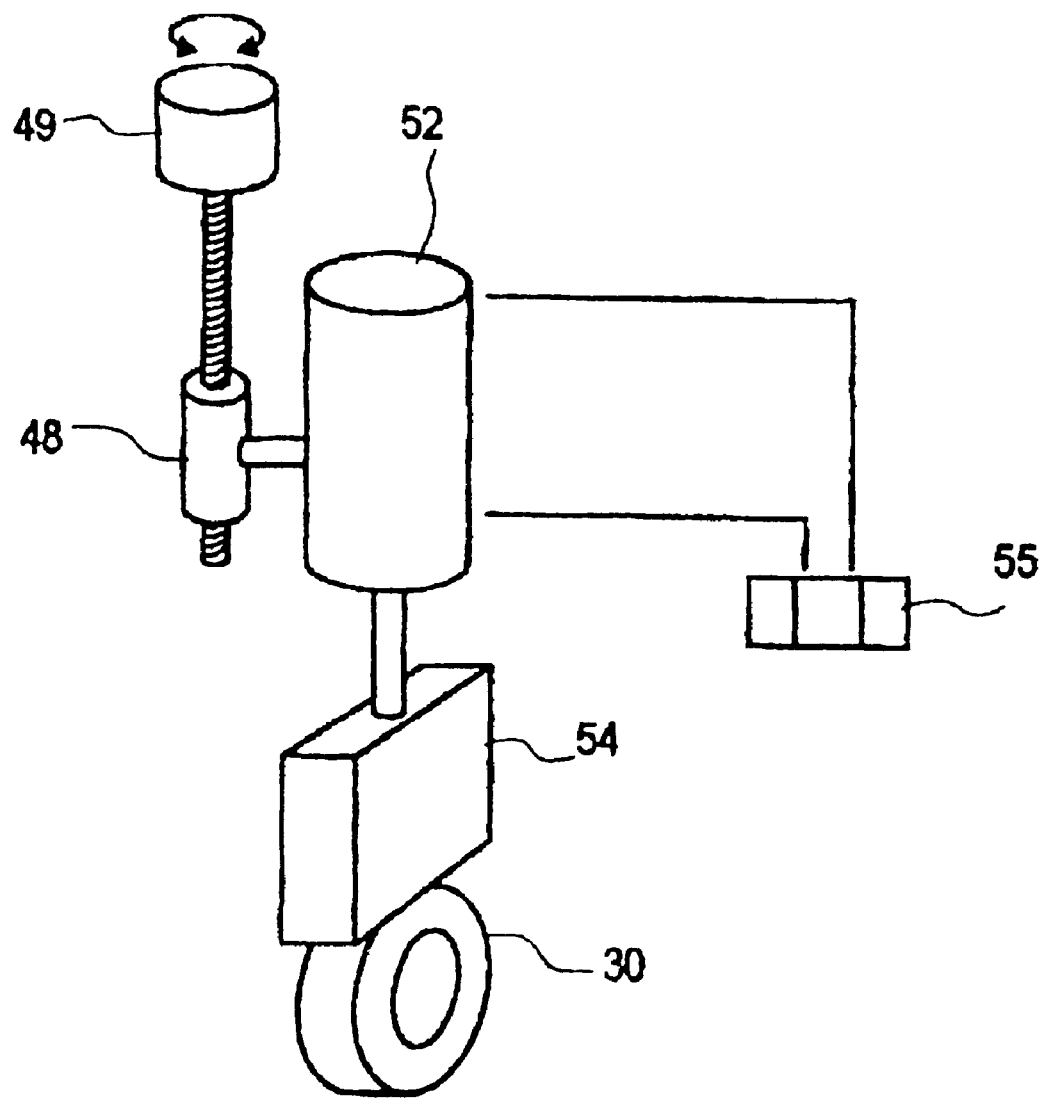

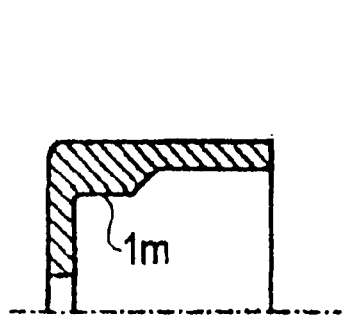
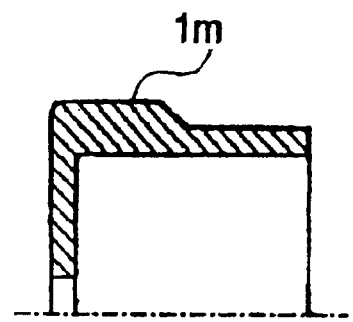
FIG. 11(a)   FIG. 11(b)
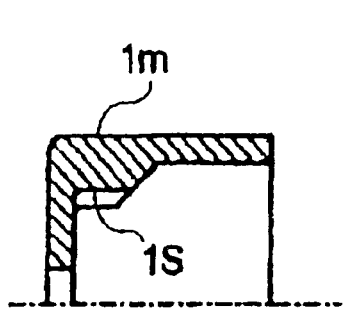
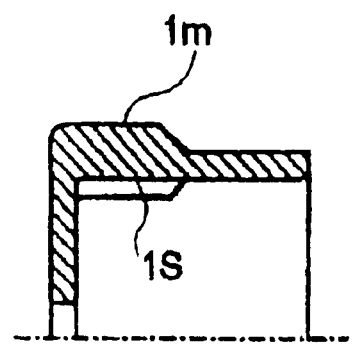
FIG. 11(c)   FIG. 11(d)

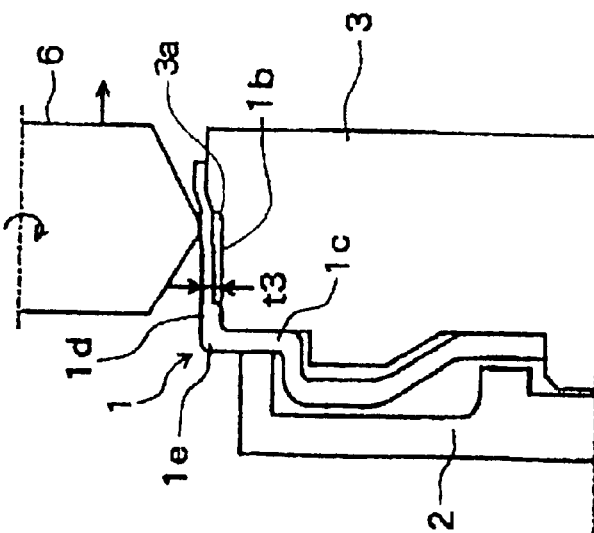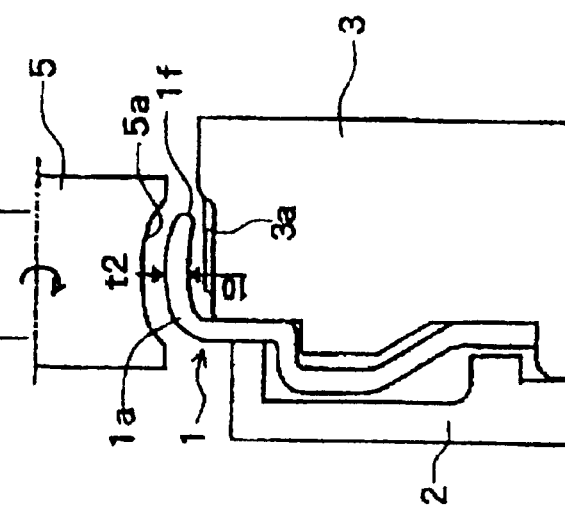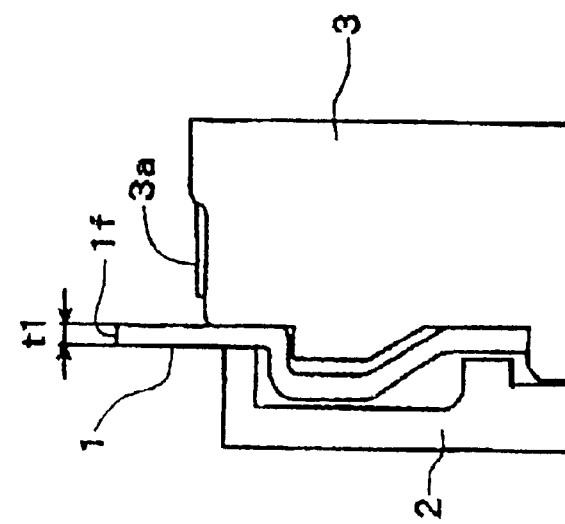

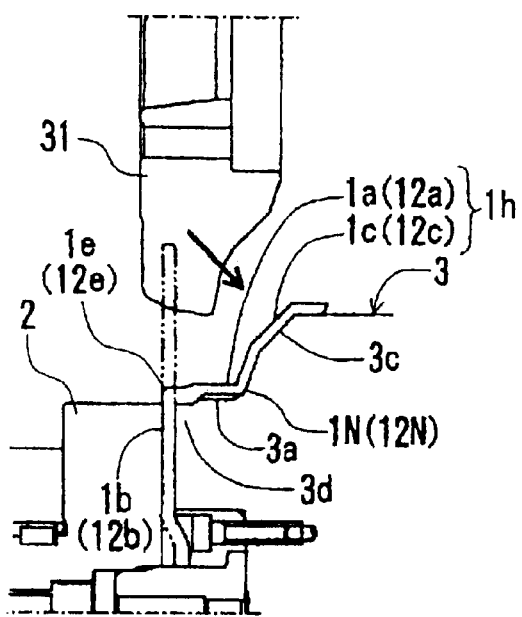
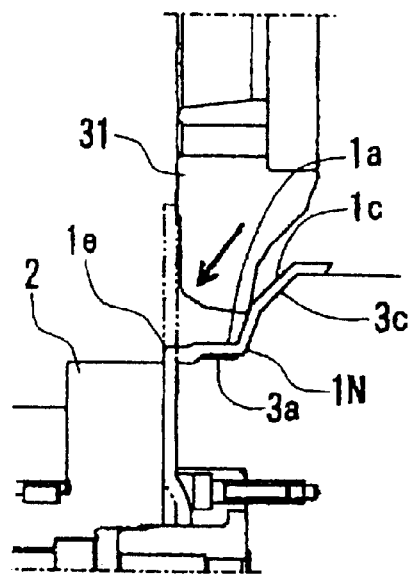
FIG. 15(a)        FIG. 15(b)
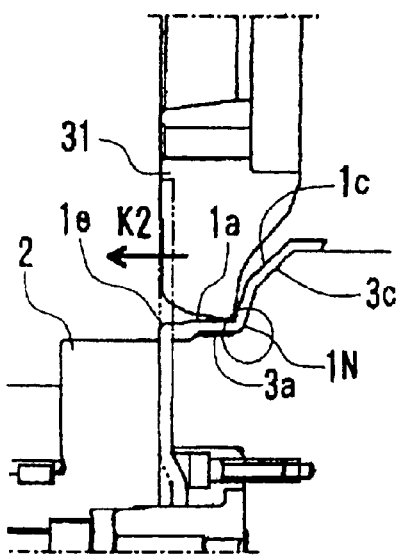
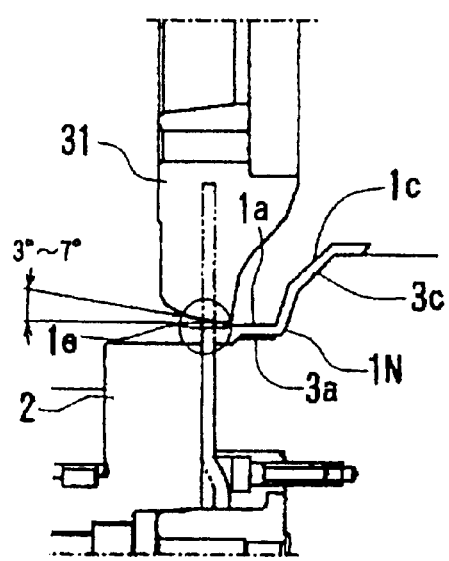
FIG.15(c)        FIG.15(d)

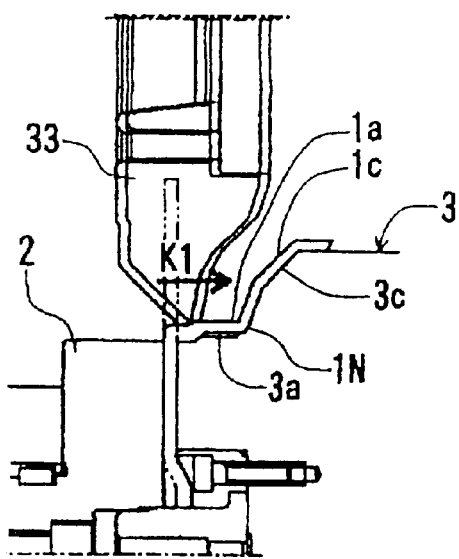
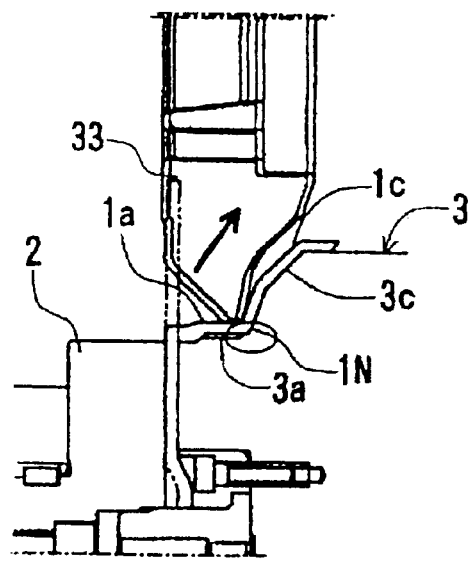
FIG. 17(a)   FIG. 17(b)
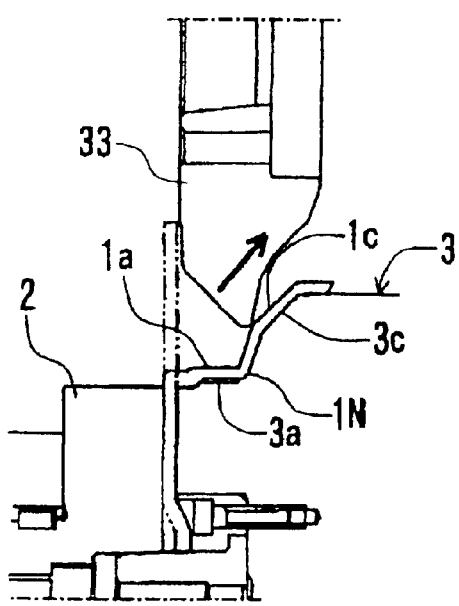
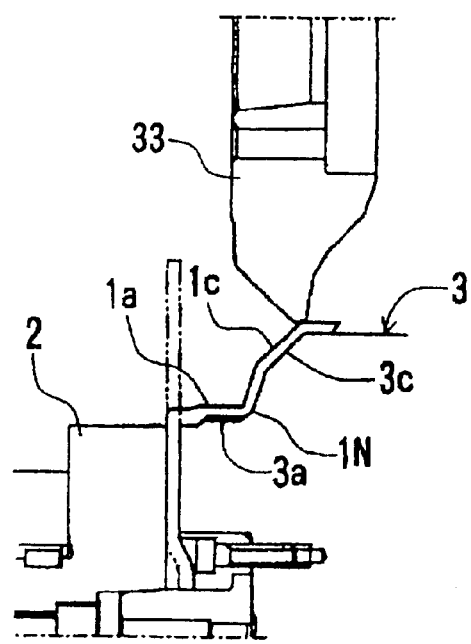
FIG. 17(c)   FIG. 17(d)

WALL THICKNESS REDUCTION RATE  $R = (t_0 - t_5)/t_0$

METHOD AND APPARATUS FOR MANUFACTURING A CYLINDRICAL MEMBER, AND CYLINDRICAL MEMBER HAVING SPLINES

BACKGROUND OF THE INVENTION

1. Field of the Invention

The invention generally relates to a method and an apparatus for manufacturing a cylindrical member by flow forming, and a cylindrical member having inner splines that is manufactured by using the method and the apparatus. More particularly, the invention relates to a method and an apparatus for partially thickening a blank, and a product manufactured by using the method and the apparatus, which are preferably applied to a front cover of a torque converter having inner splines.

2. Description of Related Art

Conventionally, some parts of the automatic transmission have splines formed at radially inward positions. For example, Japanese Laid-Open Publication No. 9-317848 describes a front cover of a torque converter. This front cover has inner splines for engaging the components such as outer friction plates in a lockup clutch composed of a multiple disc clutch. In this front cover, a drum member having the splines formed at its inner peripheral surface are welded within the front cover of sheet metal.

A cylindrical member having such splines, e.g., a front cover, is constructed by integrally welding a main body and another member having the splines. This requires troublesome processes such as welding, and also requires advanced production management such as preventing a residual sputtering material from being left within the product. Moreover, the number of parts is increased, resulting in increased costs.

For example, U.S. Pat. No. 5,718,311 describes a method for integrally forming a front cover portion and spline grooves by flow forming. However, in such a simple flow forming method, the thickness of the splined portion is significantly reduced. In view of the strength, a countermeasure is required such as forming the entire structure from a thick blank. Forming not only the splined portion but also the entire structure with a large thickness causes additional problems like increased weight of the torque converter.

In order to solve the above problems, the applicant proposed a method for manufacturing a cylindrical member having splines in Japanese Laid-Open Publication No. 11-266062. According to this method, as shown in FIG. 12(a), a disk-shaped blank 1 is fixedly held between a tailstock 2 and a mandrel 3. A multiplicity of tooth spaces 3a corresponding to the splines are formed at the outer peripheral surface of the mandrel 3. These tooth spaces 3a may either extend in the central-axis (Z-axis) direction, or may be slightly tilted with respect to the central axis. As shown in FIG. 12(b), a thickening roller 5 having a dish-shaped outer peripheral surface 5a is rotated and moved in the direction A, thereby pressing the blank 1 from the outer peripheral end face. As a result, the thickness of the blank 1 is increased (from t1 to t2), and the blank 1 is bent toward the mandrel 3. As shown in FIG. 12(c), a forming roller 6 is then rotated and moved in the direction B (Z-axis direction). As a result, the portion 1a thickened by the thickening roller 5 is spread along the mandrel 3 by plastic deformation, whereby the thickness thereof is reduced (from t2 to t3). The material thus spread is forced into the grooves 3a, whereby the splines 1b are formed.

According to the flow forming proposed by the applicant, only the portion of the front cover (cylindrical member) 1 corresponding to the splines 1b is thickened, and the front cover need not entirely be thickened, enabling reduction in weight of the torque converter. However, the blank to be formed into the cylindrical portion is entirely pressed to form the thick portion (see FIG. 12(b)), causing work hardening. Therefore, the material does not sufficiently flow into the space between the teeth 3a of the mandrel 3 in the subsequent step of forming the splines 1b with a roller 6. Accordingly, the accuracy of the splines may possibly be degraded. This problem becomes remarkable in forming the cylindrical member having a longer cylindrical portion. Moreover, the forming roller 6 is moved in the direction B. Therefore, the roller 6 pulls a shoulder portion 1e at the boundary between a circular plate portion 1c and a cylindrical portion 1d. As a result, a sufficient amount of material is less likely to remain in the shoulder portion, although the shoulder portion is subjected to large stresses for the structural reason.

Moreover, this flow forming requires large processing energy in order to thicken the entire columnar portion of the blank 1. In the case where the blank 1 as punched with a press is directly used, the accuracy of the outer peripheral end face 1f is not enough. When pressed against the outer peripheral end face of the blank, the thickening roller 5 is subjected to the large loads, and therefore the outer periphery of the thickening roller 5 is damaged by the rough end face 1f of the blank, resulting in relatively short lifetime of the roller. However, finishing the outer peripheral end face of the blank with high accuracy would require additional processes such as cutting process.

The applicant also proposed a driving apparatus for hybrid vehicles in which an electric motor 11 is mounted radially outside the torque converter 10 as shown in FIG. 13 (e.g., Japanese Patent Application No. 11-84924 and Japanese Patent Application 11-104540, which had not been laid-open upon filing of the present application). As shown in FIG. 13, a front cover 12 of a torque converter 10 has a stepped structure having an axially extending flat portion 12a in a radially intermediate portion. The front cover 12 also has a vertical portion (bottom) 12b located radially inside the flat portion. An enlarged diameter portion 12c is formed radially outside the flat portion 13 in order to accommodate a turbine runner 13. An electric motor 11 composed of a rotor 11a and a stator 11b is mounted radially outside the flat portion 12a with a predetermined space c interposed between the rotor and the flat portion 12a. The lockup clutch 15 is mounted radially inside the flat portion 12a.

The lockup clutch 15 is composed of a multiple disc clutch having a multiplicity of external friction plates (drive plates and backup plates) 16 and inner friction plates (driven plates) 17. The drum member 19 has its one end welded to the front cover 12 and extends along the flat portion 12a. Inner splines 19a are formed in the drum member 19. The outer friction plates 16 are engaged with the inner splines 19a. The inner friction plates 17 are engaged with hubs 23 connected to an input shaft 22 of a transmission 21 (automatic transmission (A/T) or continuously variable transmission (CVT)) through a damper spring 20.

The lockup clutch 15 is connected with a hydraulic pressure of a piston 26 driven with a hydraulic pressure supplied to an oil chamber 25. The torque capacity of the lockup clutch 15 is determined by the lining area of the friction members 16, 17. As described above, however, the outer friction plates 16 are engaged with the splines 19a formed in the drum member 19. Therefore, the friction members are located radially inward as compared to the case where the splines are directly formed in the front cover 12. Moreover, the length thereof is also reduced. Accordingly, a sufficient lining area of the friction members cannot be ensured, and therefore sufficient torque capacity of the lockup clutch cannot be ensured with respect to the maximum required design hydraulic value.

In this lockup clutch 15, the outer friction plates 16 are engaged with the drum member 19 that is a member separate from the front cover 12. As described above, from the manufacturing and functional point of view, it is desirable to eliminate the drum member and form the inner splines 19a in the front cover itself. However, in the case where an integral front cover 12 is formed by the aforementioned flow forming (see FIG. 12), the following problem will occur: as shown in FIG. 14, when the blank 1 is pressed with the thickening roller 5, the outer peripheral end face 1f of the blank 1 abuts on the increased diameter portion 3c of the mandrel 3 corresponding to the enlarged diameter portion 12, thereby excessively increasing the processing loads. In this case, it is difficult to thicken the portion 1g corresponding to the tooth spaces 3a of the mandrel 3. Therefore, the tooth spaces 3a cannot be sufficiently filled with the material.

SUMMARY OF THE INVENTION

Accordingly, it is an object of the invention to provide a method and an apparatus for manufacturing a cylindrical member by flow forming which solve the above problem by partially thickening a blank, and a cylindrical member having splines that is formed by using the method and the apparatus.

In order to achieve the aforementioned object, in a first aspect of the invention, a method for manufacturing a cylindrical member from a blank includes a step of partially thickening the blank by moving, on the blank held by a mandrel, a thickening roller in a radially inward direction from an intermediate portion of the blank while pressing the thickening roller against the blank, the intermediate portion being located radially inside an outer peripheral end face of the blank.

Therefore, only a required portion of the blank can be thickened by a required amount. This reduces the damage to the material, and also reduces work hardening, whereby the cylindrical member can be manufactured accurately with reduced processing loads and reduced processing energy.

Moreover, the thickening roller abuts on the blank from the intermediate portion thereof. Accordingly, even if a shear surface or a rupture surface is directly used as the outer peripheral end face of the blank, the thickening roller will not be damaged. This, together with the reduced processing loads, can improve the lifetime of the thickening roller. Moreover, the blank can be directly used as punched. This eliminates the need for the processes such as cutting, allowing improvement in manufacturing efficiency.

In a preferred form of the first aspect of the invention, the mandrel includes a columnar portion extending approximately in parallel with an axial direction, and an increased diameter portion having a larger diameter than that of the columnar portion. The blank is bent such that an radially outward surface of the blank abuts on the increased diameter portion, and the thickening step using the thickening roller is conducted with the radially outward surface being supported on the increased diameter portion.

Therefore, the blank is subjected to the thickening step with the side surface thereof being supported on the increased diameter portion of the mandrel. Accordingly, with the thickening roller, the material is reliably plastic deformed and flows, ensuring sufficient thickening of the blank.

In another preferred form of the first aspect of the invention, tooth spaces for splining are formed in the columnar portion of the mandrel, and the cylindrical member having inner splines is formed by pressing the portion thickened by the thickening step into the tooth spaces.

Therefore, the material at the thickened portion is pressed into the tooth spaces in the columnar portion of the mandrel, whereby the splines can be formed in the thickened portion.

In still another preferred form of the first aspect of the invention, the method further includes a step of forming the blank by moving a forming roller relatively in the axial direction of the mandrel while pressing the blank. The forming step is conducted after the thickening step.

Therefore, a cylindrical member having a thickened portion, and in particular, having splines at the thickened portion, can be reliably produced with the forming roller, according to the shape of the mandrel.

In yet another preferred form of the first aspect of the invention, the mandrel is formed by integrally combining the columnar portion and the increased diameter portion, and the forming roller is moved along the columnar portion and the increased diameter portion so as to form the cylindrical member having a flat portion corresponding to the columnar portion and an enlarged diameter portion corresponding to the increased diameter portion.

Therefore, the use of such a mandrel integrally comprising the cylindrical portion and the increased diameter portion facilitates accurate formation of a cylindrical member (e.g., a front cover of FIG. 13) having an enlarged diameter portion, which is conventionally difficult with flow forming.

In a further preferred form of the first aspect of the invention, the mandrel includes a main body having the columnar portion, and a movable portion movable in the axial direction relative to the main body and having the increased diameter portion. In the thickening step, the movable portion is held at such a position that the blank abuts on the increased diameter portion, and in the forming step, the movable portion is moved to such a position that the blank does not abut on the movable portion, whereby the cylindrical member corresponding to the main body is formed.

Therefore, the use of the mandrel having a movable portion allows manufacturing of not only a cylindrical member having an enlarged diameter portion but also a cylindrical member having no enlarged diameter portion (stepped portion).

In a still further preferred form of the first aspect of the invention, the method further includes a step of pressing the portion thickened by the thickening step against the columnar portion of the mandrel by moving a pressing roller in a radially inward direction. The pressing step is conducted between the thickening step and the forming step.

Therefore, the thickened portion is pressed against the columnar portion of the mandrel by using the pressing roller. This allows improvement in accuracy of the flat portion corresponding to the columnar portion, in particular, the flat portion with splines.

In a yet further preferred form of the first aspect of the invention, the thickening roller has an outer peripheral surface tilted by a predetermined angle such that, in the columnar portion, a material flows in a radially inward direction of the blank.

Therefore, the thickening roller has a tilted outer peripheral surface. This prevents an underfill portion from being produced at the joint between the bottom and the flat portion of the cylindrical member, that is, at the shoulder portion that is subjected to large stresses for the structural reason. Accordingly, a strong cylindrical member can be reliably manufactured.

In a second aspect of the invention, an apparatus for manufacturing a cylindrical member from a blank includes: a mandrel; a fixing member for holding the blank against the mandrel; and a thickening roller moving in axial and radial directions relative to the mandrel. The blank is partially thickened by moving, on the blank held by the mandrel and the fixing member, the thickening roller in a radially inward direction from an intermediate portion of the blank while pressing the thickening roller against the blank, the intermediate portion being located radially inside an outer peripheral end face of the blank.

Therefore, a manufacturing apparatus capable of reliably achieving the effects described in the first aspect of the invention can be obtained.

In a preferred form of the second aspect of the invention, the mandrel includes a columnar portion extending approximately in parallel with the axial direction, and an increased diameter portion having a larger diameter than that of the columnar portion. The blank is bent such that an radially outward side surface of the blank abuts on the increased diameter portion, and the thickening roller is operated so as to partially thicken the blank with the radially outward side surface being supported on the increased diameter portion.

Therefore, a manufacturing apparatus capable of reliably achieving the effects described in the preferred aspect of the preferred form of the first aspect of the invention can be obtained.

In another preferred form of the second aspect of the invention, tooth spaces for splining are formed in the columnar portion of the mandrel, and the cylindrical member having inner splines is formed by pressing the portion thickened by the thickening step into the tooth spaces.

Therefore, a manufacturing apparatus capable of reliably achieving the effects described in the another preferred form of the first aspect of the invention can be obtained.

In still another preferred form of the second aspect of the invention, the apparatus further includes a forming roller operated so as to move relatively in the axial direction of the mandrel while pressing the blank.

Therefore, a manufacturing apparatus capable of reliably achieving the effects described in the still another preferred form of the first aspect of the invention can be obtained.

In yet another preferred form of the second aspect of the invention, the mandrel is formed by integrally combining the columnar portion and the increased diameter portion. The forming roller is moved along the columnar portion and the increased diameter portion so as to form the cylindrical member having a flat portion corresponding to the columnar portion and an enlarged diameter portion corresponding to the increased diameter portion.

Therefore, a manufacturing apparatus capable of reliably achieving the effects described in the yet another preferred form of the first aspect of the invention can be obtained.

In a further preferred form of the second aspect of the invention, the mandrel includes a main body having the columnar portion, and a movable portion movable in the axial direction relative to the main body and having the increased diameter portion. During operation of the thickening roller, the movable portion is held at such a position that the blank abuts on the increased diameter portion, and during operation of the forming roller, the movable portion is moved to such a position that the blank does not abut on the movable portion, whereby the cylindrical member corresponding to the main body is formed.

Therefore, a manufacturing apparatus capable of reliably achieving the effects described in the further preferred form of the first aspect of the invention can be obtained.

In a still further preferred form of the second aspect of the invention, the apparatus further includes a pressing roller operated so as to press the portion thickened by the thickening roller against the columnar portion of the mandrel.

Therefore, a manufacturing apparatus capable of reliably achieving the effects described in the still further preferred form of the first aspect of the invention can be obtained.

In a yet further preferred form of the second aspect of the invention, the thickening roller has an outer peripheral surface tilted by a predetermined angle such that a diameter of the thickening roller is reduced toward a portion of the blank that is held by the mandrel and the fixing member.

Therefore, a manufacturing apparatus capable of reliably achieving the effects described in the yet further preferred form of the first aspect of the invention can be obtained.

In a yet further preferred form of the second aspect of the invention, the mandrel and the fixing member are rotatable and movable in an axial direction, and the thickening roller and the forming roller are movable in an axial direction relative to the mandrel.

Therefore, the mandrel is movable in the axial direction, and the thickening roller and the forming roller are movable in the radial direction. With such a simple structure, cylindrical members having various shapes corresponding to the mandrel can be easily manufactured in a reliable manner by controlling the timing and speed of the movement of the combination of these elements.

In a yet further preferred form of the second aspect of the invention, the apparatus further includes a turret rotatable about an axis extending in parallel with the axis of the mandrel. The thickening roller and the forming roller are supported on the turret, and by rotating the turret, the thickening roller or the forming roller is moved so as to face the mandrel.

Therefore, the thickening roller and the forming roller are supported on the turret so that the rollers sequentially face the mandrel as required. Accordingly, the cylindrical member can be efficiently manufactured in an automated manner.

In a yet further preferred form of the second aspect of the invention, the forming roller is composed of a plurality of different types of rollers such as a rough roller and a finishing roller.

Therefore, the cylindrical member can be formed with improved accuracy by using the forming roller composed of the plurality of different types of rollers.

In a third aspect of the invention, a cylindrical member manufactured from a blank integrally comprises: a bottom having a thickness approximately the same as that of the blank; a flat portion extending approximately in parallel with an axial direction, and including a thick portion having a thickness larger than that of the blank; and inner splines formed at an inner peripheral surface of the thick portion.

Therefore, the cylindrical member includes the bottom having a thickness approximately the same as that of the blank and the flat portion including a thick portion having a thickness larger than that of the bottom. Moreover, the inner splines are integrally formed at the inner peripheral surface of the thick portion. Therefore, a sufficiently strong, splined cylindrical member having a predetermined thick portion as a spline portion can be obtained without increasing the total weight of the cylindrical member.

In a preferred form of the third aspect of the invention, the bottom is integrally connected to one axial end of the flat portion, and an enlarged diameter portion having a larger diameter than that of the flat portion is integrally connected to the other axial end of the flat portion.

Therefore, a cylindrical member having an enlarged diameter portion integrally connected to the other axial end of the flat portion and also having splines integrally formed in the thick portion can be obtained.

In another preferred form of the third aspect of the invention, the cylindrical member is a front cover of a torque converter.

Therefore, the torque converter including a flat portion and an enlarged diameter portion has the splines directly formed at the inner peripheral surface of the flat portion. Therefore, outer friction members having a large diameter is engaged with the splines, whereby the torque capacity of the friction members can be assured.

In still another preferred form of the third aspect of the invention, outer friction members of a lockup clutch composed of a multiple disc clutch is engaged with the splines formed at the inner peripheral surface of the flat portion. An electric motor is provided radially outside the flat portion.

Therefore, in the case where the outer diameter of the electric motor is specified in view of the in-vehicle dimensional limit, the electric motor can be mounted radially outside the flat portion of the front cover in order to satisfy such dimensional requirement. Moreover, the lining area is increased by forming the splines directly in the front cover. Therefore, required torque capacity of the lockup clutch located radially inside the flat portion can be assured.

In a fourth aspect of the invention, in a method for manufacturing a cylindrical member from a blank by using a mandrel, the mandrel includes a columnar portion and an increased diameter portion having a larger diameter than that of the columnar portion, and the columnar portion extends approximately in parallel with an axial direction and has tooth spaces for splining formed at its outer peripheral surface. The method includes a step of: accumulating a material at an enlarged diameter portion of an intermediate portion of the blank on a flat portion of the intermediate portion by moving, on the blank held by the mandril, a thickening roller along the increased diameter portion toward the columnar portion while pressing the intermediate portion of the blank against the increased diameter portion of the mandrel. The intermediate portion is located radially inside an outer peripheral end face of the blank, the enlarged diameter portion corresponds to the increased diameter portion of the mandrel, and the flat portion corresponds to the columnar portion of the mandrel. In the thickening step, a void having no material filled therein is provided at an intersection of the increased diameter portion and the columnar portion of the mandrel so that an underfill portion corresponding to the void is provided at a corner of the blank where the enlarged diameter portion and the flat portion intersect each other.

Therefore, in the step subsequent to the thickening step such as the pressing step or the forming step, the material in the flat portion smoothly flows into the void and will not flow back toward the shoulder portion. Accordingly, the bottom can be prevented from being curved (deformed) near the shoulder portion.

In a preferred form of the fourth aspect of the invention, the method further includes a step of pressing, in an axially inward direction, an outer peripheral surface of the flat portion thickened by the thickening step by using a pressing roller, so as to force the material at an inner peripheral surface of the flat portion into the tooth spaces. The pressing step is conducted after the thickening step.

Therefore, the material at the inner peripheral surface of the flat portion is pressed into the tooth spaces in the pressing step. At this point, the material in the flat portion smoothly flows into the void and will not flow back toward the shoulder portion. Accordingly, the bottom can be prevented from being curved (deformed) near the shoulder portion.

In another preferred form of the fourth aspect of the invention, the tooth spaces and the void are filled with the material in the pressing step.

Therefore, manufacturing of the cylinder member can be completed by filling the tooth spaces and the void with the material in the pressing step. At this point, the material in the flat portion smoothly flows into the void and will not flow back toward the shoulder portion. Accordingly, the bottom can be prevented from being curved (deformed) near the shoulder portion.

In still another form of the fourth aspect of the invention, a portion that is not filled with the material is left in the tooth spaces and the void in the pressing step.

Therefore, the material at the inner peripheral surface of the flat portion is pressed into the tooth spaces in the pressing step. At this point, a portion that is not filled with the material is left in the tooth spaces and the void. Therefore, backflow of the material can be prevented, for example, in the case where the forming step is conducted after the pressing step.

In yet another form of the fourth aspect of the invention, the method further includes a step of forming the blank by moving a forming roller in the axial direction toward the corner while pressing an outer peripheral surface of the flat portion in a radially inward direction in order to fill the non-filled portion in the tooth spaces and the void with the material. The forming step is conducted after the pressing step.

Therefore, manufacturing of the cylinder member can be completed by filling the tooth spaces and the void with the material in the forming step subsequent to the pressing step. At this point, the material in the flat portion smoothly flows into the void and will not flow back toward the shoulder portion. Accordingly, the bottom can be prevented from being curved (deformed) near the shoulder portion.

BRIEF DESCRIPTION OF THE DRAWINGS

FIGS. 1(*a*) to 1(*c*) are diagrams illustrating a manufacturing method of the invention, wherein FIG. 1(*a*) shows a step of holding a blank, FIG. 1(*b*) shows the bending step, and FIG. 1(*c*) shows the thickening step;

FIG. 7 is a schematic diagram of a roller unit for a bending roller;

FIGS. 10(a) to 10(d) are diagrams illustrating a method for manufacturing a cylindrical member having no enlarged diameter portion, wherein FIG. 10(a) shows the bending step, FIG. 10(b) shows the thickening step, FIG. 10(c) shows the pressing step, and FIG. 10(d) shows the forming step;

FIGS. 11(a) to 11(d) are cross-sectional views respectively showing cylindrical members with different shapes manufactured by the manufacturing method;

FIGS. 12(a) to 12(c) are diagrams showing different steps in a manufacturing method previously proposed by the applicant;

FIGS. 15(a) to 15(d) are diagrams showing the thickening step in a second embodiment of the invention;

FIGS. 17(a) to 17(d) are diagrams showing the forming step in the second embodiment;

DETAILED DESCRIPTION OF PREFERRED EMBODIMENTS

Hereinafter, embodiments of the invention will be described with reference to the accompanying drawings.

(First Embodiment)

First, a manufacturing method of a cylindrical member, which is preferably used to form a front cover of the torque converter for hybrid vehicles described above, will be described with reference to FIG. 1(a) to FIG. 4.

Figure 13:
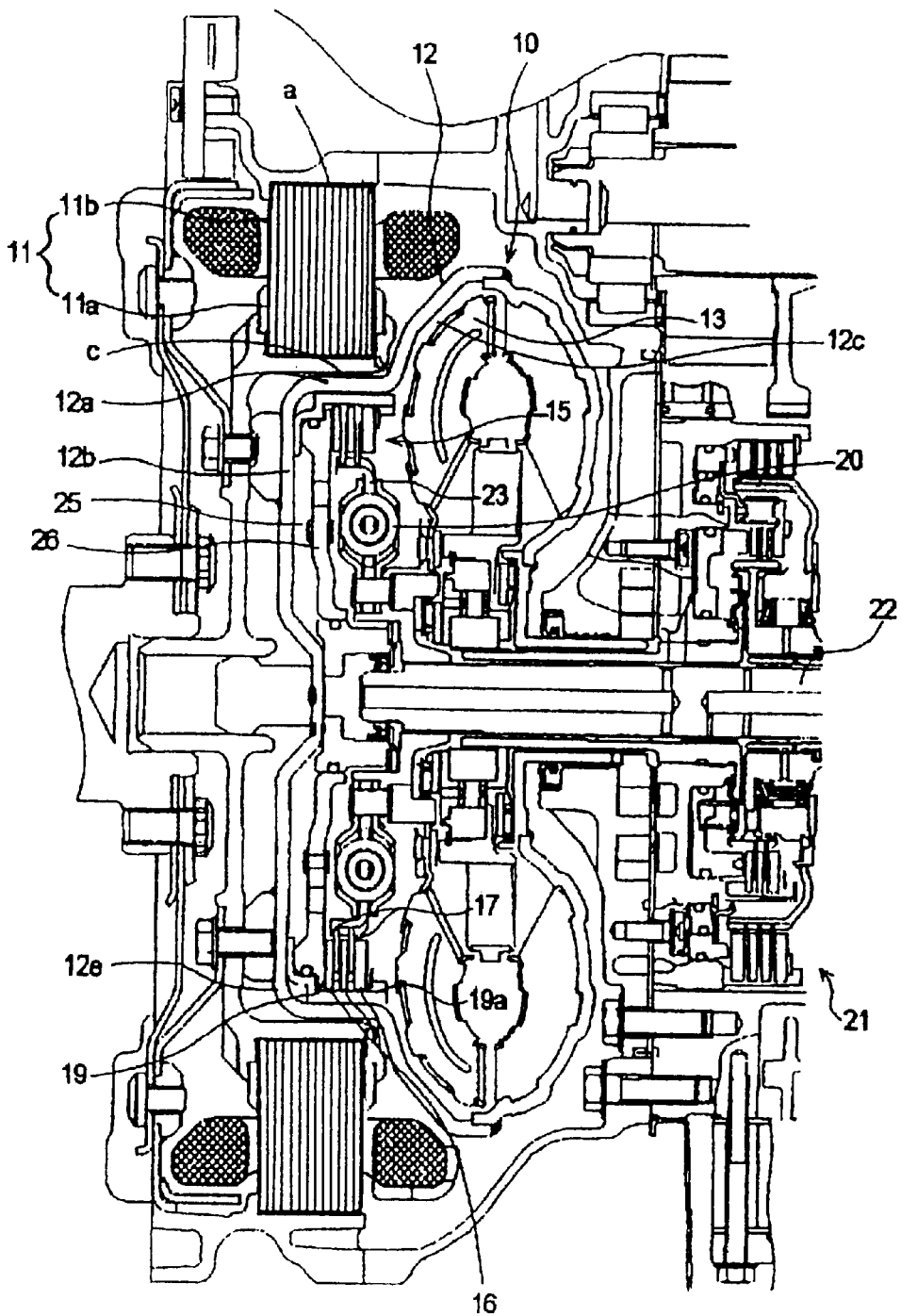
FIG. 13 is a cross-sectional view of a driving apparatus for hybrid vehicles that is previously proposed by the applicant.
Figure 14:
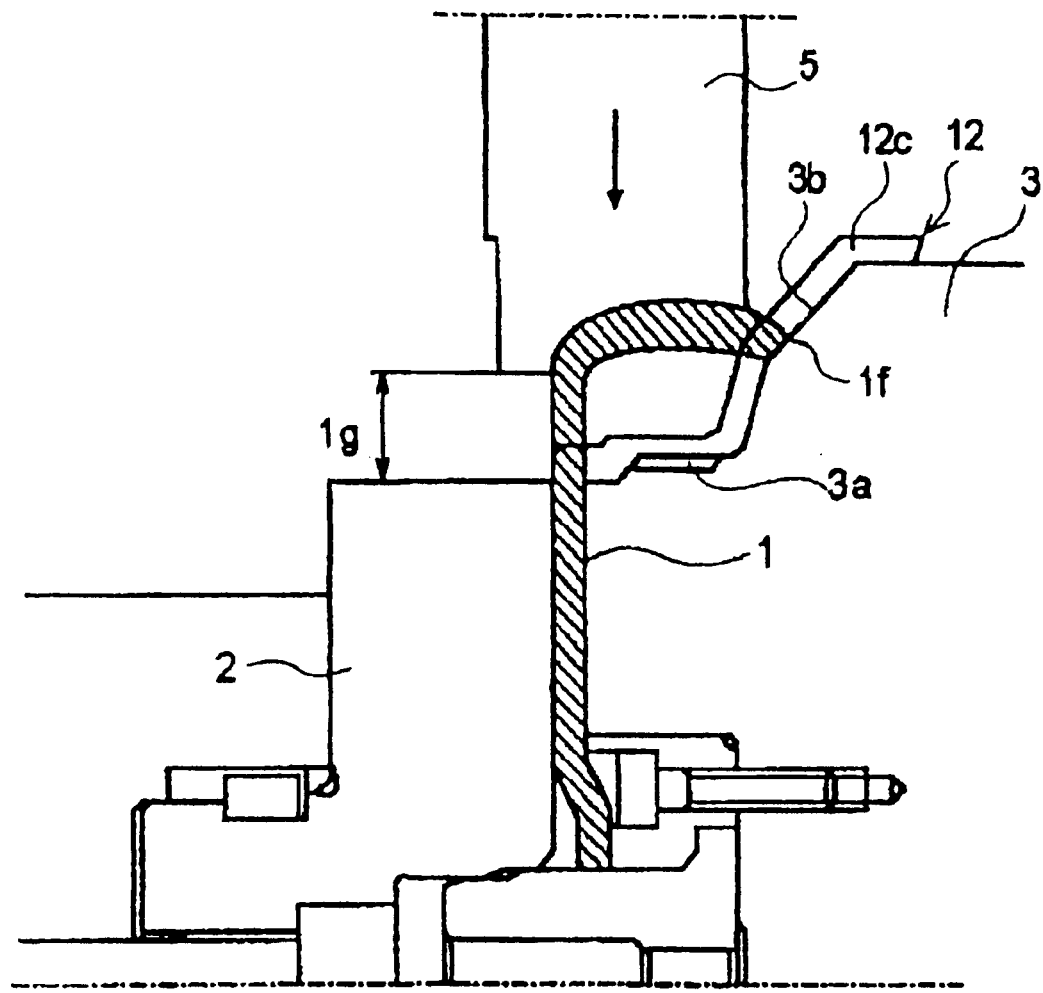
FIG. 14 is a cross-sectional view illustrating the reason why manufacturing is difficult by the manufacturing method shown FIGS. 12(a) to 12(c)

First, as shown in FIG. 1(a), a disk-shaped blank 1 is fixed to one end face of a mandrel 3 so as to be held between the end face of the mandrel 3 and a tailstock 2. The plate thickness t1 of the blank 1 is approximately the same as that of the regular portion of the front cover 12 (i.e., the portion other than a flat portion 12a). The blank 1 is formed by punching with a press, and has a center hole 1k and an outer peripheral surface 1f. The shear surfaces of the center hole 1k and the outer periphery 1f as produced by the punching can be directly used without further processing. The mandrel 3 is shaped so as to correspond to the shape of the front cover 12 shown in FIG. 13. More specifically, the mandrel 3 has an end face 3b corresponding to the a vertical portion (bottom) 12b located radially inward, an increased diameter portion 3c corresponding to an enlarged diameter portion 12c located radially outward, and a columnar portion 3d corresponding to the intermediate flat portion 12a. A multiplicity of tooth spaces 3a corresponding to splines 12f are formed over the whole outer peripheral surface of the columnar portion 3d at regular intervals. These tooth spaces 3a each have a prescribed length L in the axial direction (see FIG. 4). Note that the tooth spaces 3a may either be formed in parallel with the axis or inclined by a prescribed angle with respect to the axis.

As shown in FIG. 1(b), a bending roller 30 is then moved in the oblique direction C relative to the mandrel 3 so as to bend the blank 1 into a cup shape. One or a plurality of bending rollers 30 may be used. This movement in the oblique direction C may either be implemented by moving the bending roller 30 obliquely with the mandrel being fixed in the axial direction, or by moving the bending roller 30 in the radial direction while moving the rotating mandrel in the axial direction. An R-shaped corner 30a of the bending roller 30 is thus pressed against the radially outward portion of the blank 1 so as to make the surface of the radially outward portion in contact with the increased-diameter portion 3c of the mandrel 3 at a predetermined position. Note that the corner 30a has an R-shape that does not affect formation of the blank 1.

Figures 2A, 2B:
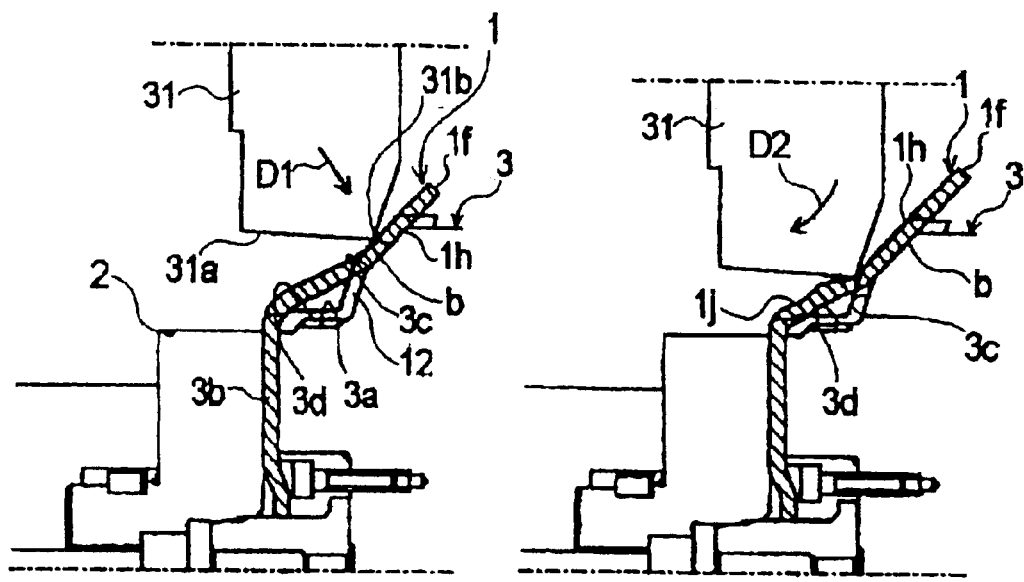
FIGS. 2(*a*) to 2(*c*) are diagrams showing the stages of the thickening step.
Figure 2C:
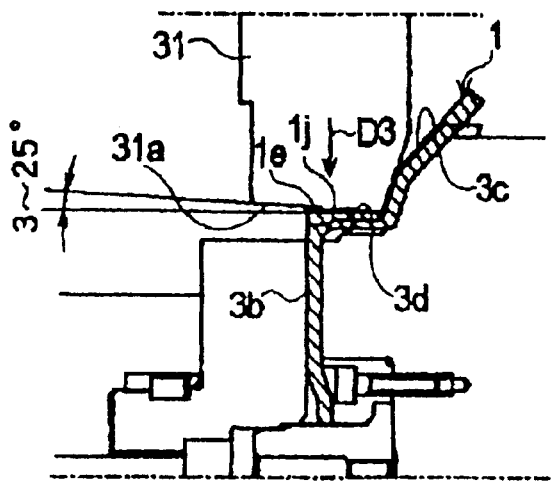

As shown in FIG. 1(c), a thickening roller 31 is then moved in the direction D relative to the mandrel 3 so as to partially thicken the blank 1. As shown in FIGS. 2(a) to 2(c), the thickening roller 31 has its outer peripheral surface 31a tilted by a predetermined angle (preferably, 3° to 7°) with respect to the line that is in parallel with the axis, so that the diameter thereof is reduced in the direction from the increased diameter portion 3c toward the end face 3b of the mandrel 3. The thickening roller 31 has a corner 31b facing the increased diameter portion 3c. The corner 31b has an R-shape that is approximately the same as, or slightly larger than, that of an R portion a of the front cover 12. The R portion a is a portion located at the boundary between the flat portion 12a and the enlarged diameter portion 12c of the finished front cover 12 (see FIG. 13). The thickening roller 31 is subjected to great loads in the radial direction as well. It is therefore desirable in terms of the processing stability to provide at least three thickening rollers 31 approximately on the same plane so as to cancel the loads applied to the mandrel. This movement in the direction D may be implemented by moving only the thickening roller with the mandrel being fixed in the axial direction. However, it is desirable to move the thickening roller in the radial direction while moving the mandrel in the axial direction. In this case, the movement in the direction D is implemented according to combination and timing of the respective movement of the thickening roller and the mandrel.

As shown in FIG. 2(a), in the thickening step, the thickening roller 31 is moved in the direction D1, that is, the thickening roller 31 is moved so as to press a predetermined intermediate portion 1h of the blank 1 against a predetermined portion b of the increased diameter portion 3c of the mandrel 3. The predetermined side portion 1h of the blank 1 is thus supported by the prescribed portion b of the mandrel 3. As shown in FIG. 2(b), the thickening roller 31 is then moved in the direction D2, that is, along the contour of the increased diameter portion 3c of the mandrel 3. With the blank 1 being supported at the predetermined intermediate side position 1h, the thickening roller 31 moves the material of the blank 1 from that position toward the radially inward direction. The material in the portion radially outward the predetermined position is thus partially moved toward the columnar portion 3d of the mandrel, thereby thickening the blank 1. This thickening step is started from the intermediate portion of the blank 1. It is therefore possible to partially thicken the blank 1 according to a required amount to be thickened. This reduces the forming loads as compared to the method shown in FIG. 12. Moreover, the thickening roller 31 does not contact the outer peripheral end face 1f of the blank 1. Therefore, the thickening roller has a long life, and the accuracy of the outer peripheral end face of the blank is not required. Accordingly, the outer peripheral end face of the blank as punched can be directly used without further processing.

As shown in FIG. 2(c), the portion 1j thus thickened is spread between the columnar portion 3d of the mandrel and the outer peripheral surface 31a of the thickening roller 31, thereby forming the portion 1j as a thickened portion having a predetermined thickness t4 (t4>t1). As described above, the outer peripheral surface 31a of the thickening roller is tilted in the elevation-angle direction toward the end face of the mandrel. Therefore, the material is likely to move toward a shoulder portion 1e of the blank, that is, a shoulder portion 12e that is subjected to large stresses due to the structure of the front cover (see FIG. 13). As a result, the shoulder portion 12e at the joint between the vertical portion (bottom) 12b and the flat portion 12a can be reliably thickened, thereby improving the strength of the front cover 12.

Figure 3A:
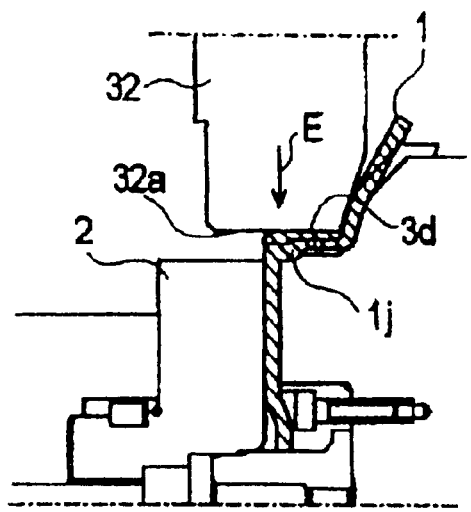
FIGS. 3(*a*) and 3(*b*) are diagrams illustrating a manufacturing method of the invention, wherein FIG. 3(*a*) shows the pressing (profiling) step and FIG. 3(*b*) shows the forming (flow forming) step.

As shown in FIG. 3(a), a pressing roller (sizing roller) 32 is then moved in the radially inward direction E so as to profile (press) the thickened portion 1j. One or a plurality of pressing rollers 32 may be used. The pressing roller 32 has its outer peripheral surface 32a extending approximately in parallel with the axis. The pressing roller 32 presses the thickened portion 1j of the blank 1 against the columnar portion 3d of the mandrel 3, whereby the outer peripheral surface of the thickened portion 1j is formed to have a profile corresponding to that of the flat portion 12a of the front cover 12. At this point, part of the material is pressed into the tooth spaces 3a of the mandrel.

Figure 3B:
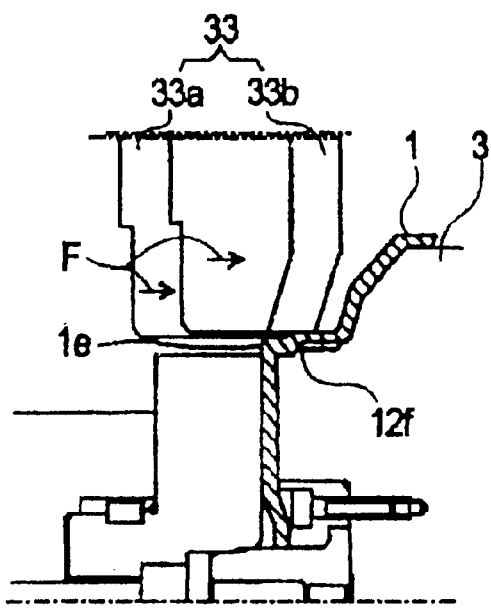

As shown in FIG. 3(b), a forming roller 33 is then moved in the direction F relative to the mandrel for flow forming. It is desirable in terms of the processing accuracy to use a forming roller 33 composed of a plurality of types of rollers such as a finishing roller 33a and a rough roller 33b. As the roller 33 is moved in the direction F, it moves along the profile of the mandrel 3. This movement in the direction F may be implemented by moving only the forming roller 33 in the direction F, but is preferably implemented by moving the forming roller 33 in the radial direction while moving the rotating mandrel 3 in the axial direction.

It is possible to form the splines by the flow-forming step even when the profiling (pressing) step is omitted. However, it is preferable to conduct the flow-forming (forming) step (FIG. 3(b)) with a part of the material being pressed into the tooth spaces 3a of the mandrel in advance in the profiling step (FIG. 3(a)). The reason for this is as follows: by the forming process, the blank 1 is formed into a prescribed shape corresponding to the shape of the mandrel 3 by the forming step. The forming process also ensures that the material flows into the tooth spaces 3a of the mandrel so as to reliably form the splines 12f. At this point, underfill can be prevented from occurring in the shoulder portion 1e (corresponding to the shoulder portion 12e of the front cover). Note that, as described above, the splines 12f may either be formed as splines extending in parallel with the axis or as helical splines tilted with respect to the axis according to the shape of the tooth spaces 3a.

Figure 4:
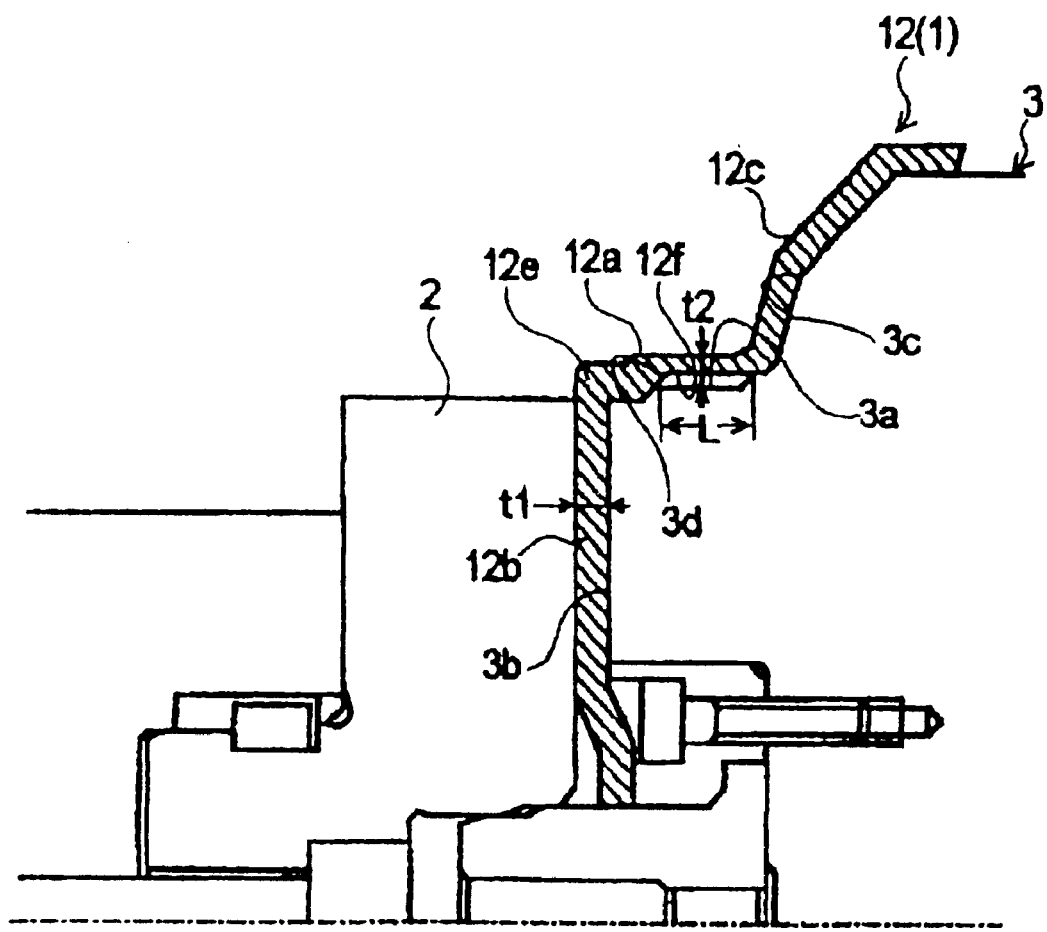
FIG. 4 is a cross-sectional view of a cylindrical member (front cover) manufactured by a manufacturing method of the invention.

According to this manufacturing method, the front cover 12 is formed as shown in FIG. 4. The front cover 12 has a vertical portion (bottom) 12b located radially inward, a flat portion 12a connected to the bottom through a shoulder 12e, inner splines 12f formed at the inner peripheral surface of the thickened flat portion, and an enlarged diameter portion 12c located radially outward and shaped corresponding to a turbine runner. The front cover 12 is thickened only in the flat portion 12a having the splines 12f (t2>t1), and the other members have a small thickness approximately corresponding to the plate thickness t1 of the blank 1 for making the front cover 12 lightweight. This front cover 12 does not require a member such as drum member 19 having splines (see FIG. 13), thereby facilitating the manufacturing process. Moreover, the splines 12f are formed directly at the inner peripheral surface of the flat portion 12a of the front cover 12. Thus, the splines 12f can be formed further outward in the radial direction and can be made longer as compared with the splines 19a formed in the drum member of the front cover having the same contour. Therefore, the lining area of friction plates 16, 17 of a lockup clutch 15 (see FIG. 13) is increased, allowing increase in the torque capacity of the lockup clutch. As a result, an electric motor 11 can be mounted in the torque converter portion within the in-vehicle dimensional limit. In addition, it becomes possible to configure a lockup clutch having the torque capacity satisfying the maximum required design hydraulic pressure.

Figure 5A:
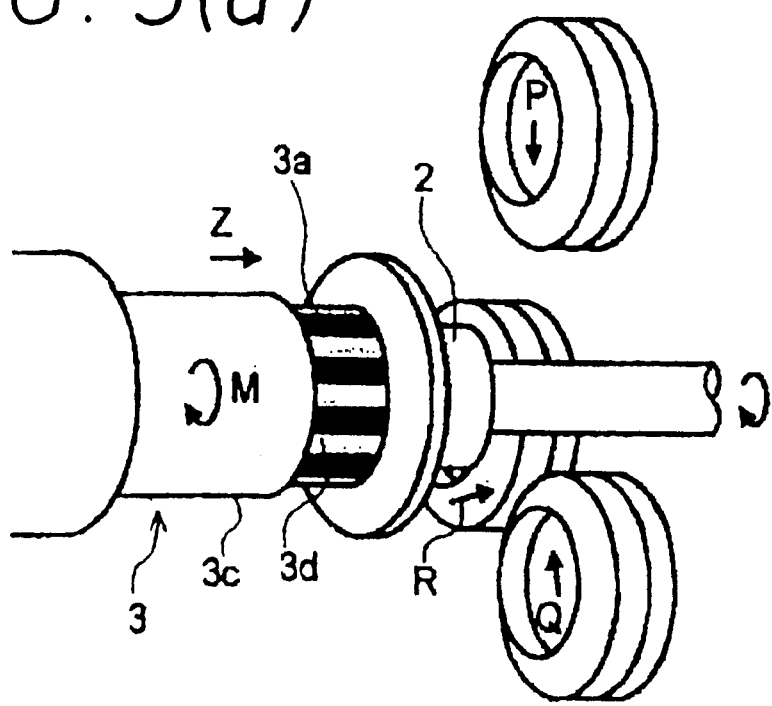
FIGS. 5(*a*) and 5(*b*) are schematic perspective views showing different states of a manufacturing apparatus of the invention.
Figure 5B:
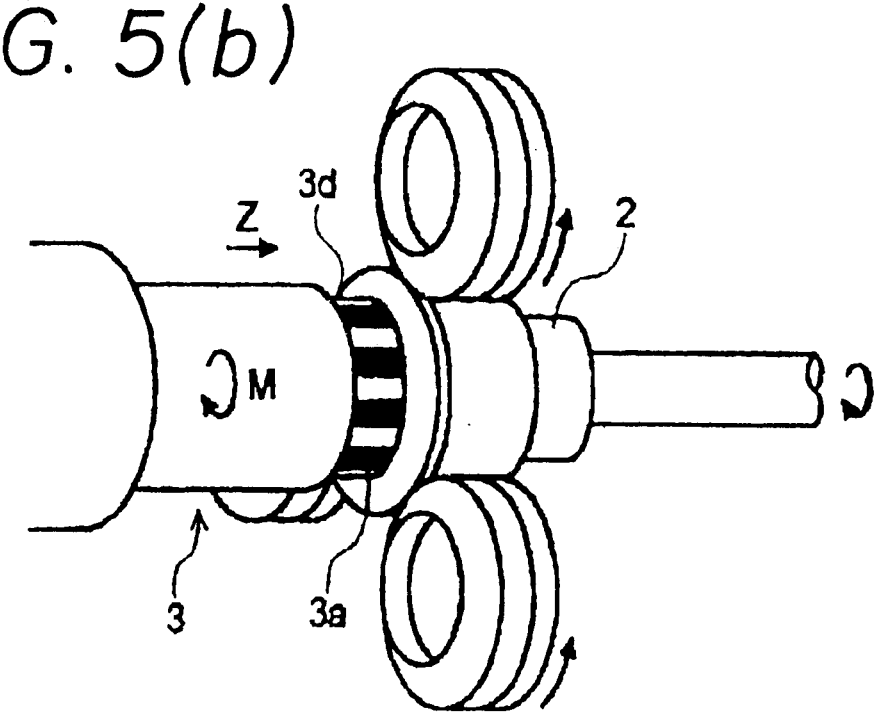

Hereinafter, a manufacturing apparatus capable of conducting the aforementioned manufacturing method will be described with reference to FIGS. 5(a) to 9. As shown in FIGS. 5(a) and 5(b), the manufacturing apparatus of the invention includes a mandrel 3 and a tailstock 2 which are arranged in the Z-axis direction. The mandrel 3 has a columnar portion 3d having tooth spaces 3a, and an increased diameter portion 3c (see FIG. 4). Rollers are arranged about the mandrel 3 so that each axis of the rollers is in parallel with the Z-axis. The mandrel 3 is driven to rotate in the direction M and to move in the Z-axis direction, that is, in the direction Z. Each roller is driven to move in the radial direction, that is, in the direction of the corresponding axis P, Q, R.

Figure 6:
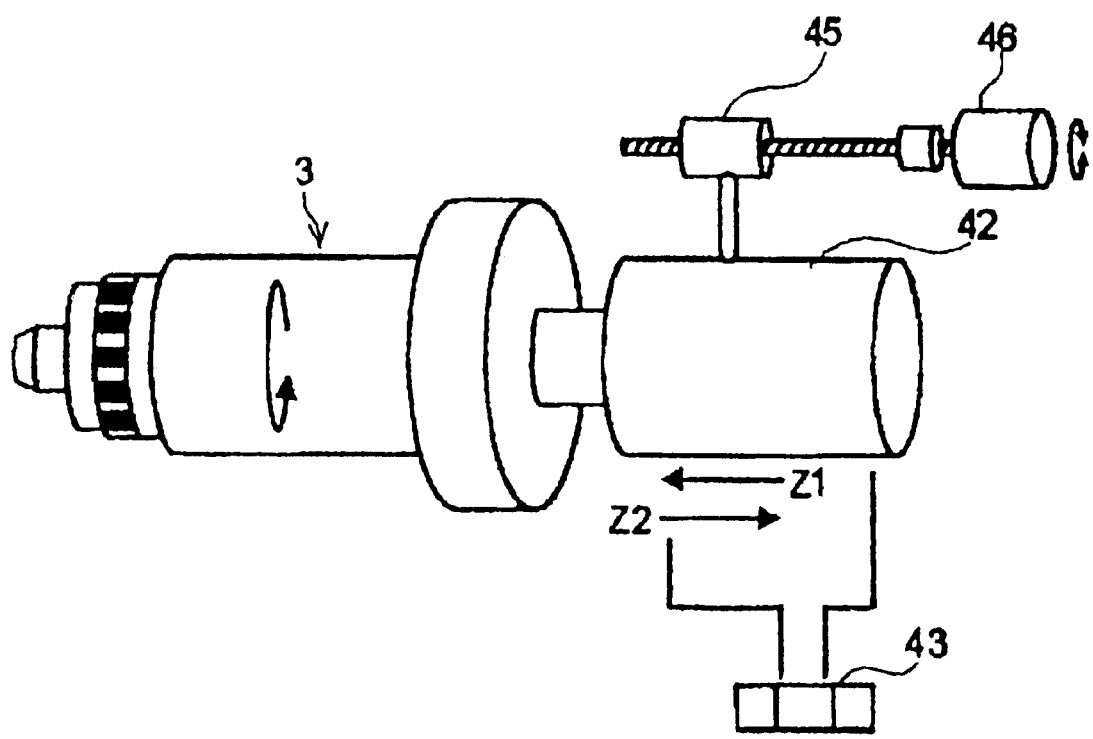
FIG. 6 is a schematic diagram of a mandrel portion.

As shown in FIG. 6, a hydraulic cylinder 42 is connected to the mandrel 3. By operating the hydraulic cylinder 42 with a servo valve 43, the mandrel 3 can be moved in both directions of the z-axis, that is, in the directions Z1, Z2. Such movement of the mandrel 3 is converted to rotation through a ball screw 45 for transmission to an incremental encoder 46. The encoder 46 detects the axial position of the mandrel 3, and operates the servo valve 43 according to the detection result.

FIG. 7 shows a roller unit preferably applied to a single roller such as bending roller 30. Like the mandrel 3, a hydraulic cylinder 52 is connected to a frame 54 rotatably supporting the roller. By operating the hydraulic cylinder 52 with a servo valve 55, the roller 30 can be moved in the radial direction (e.g., the P-axis direction in FIG. 5(a)). An incremental encoder 49 detects the position of the roller 30 via a ball screw 48, and servo-control the roller 30 according to the detection result.

Figure 8:
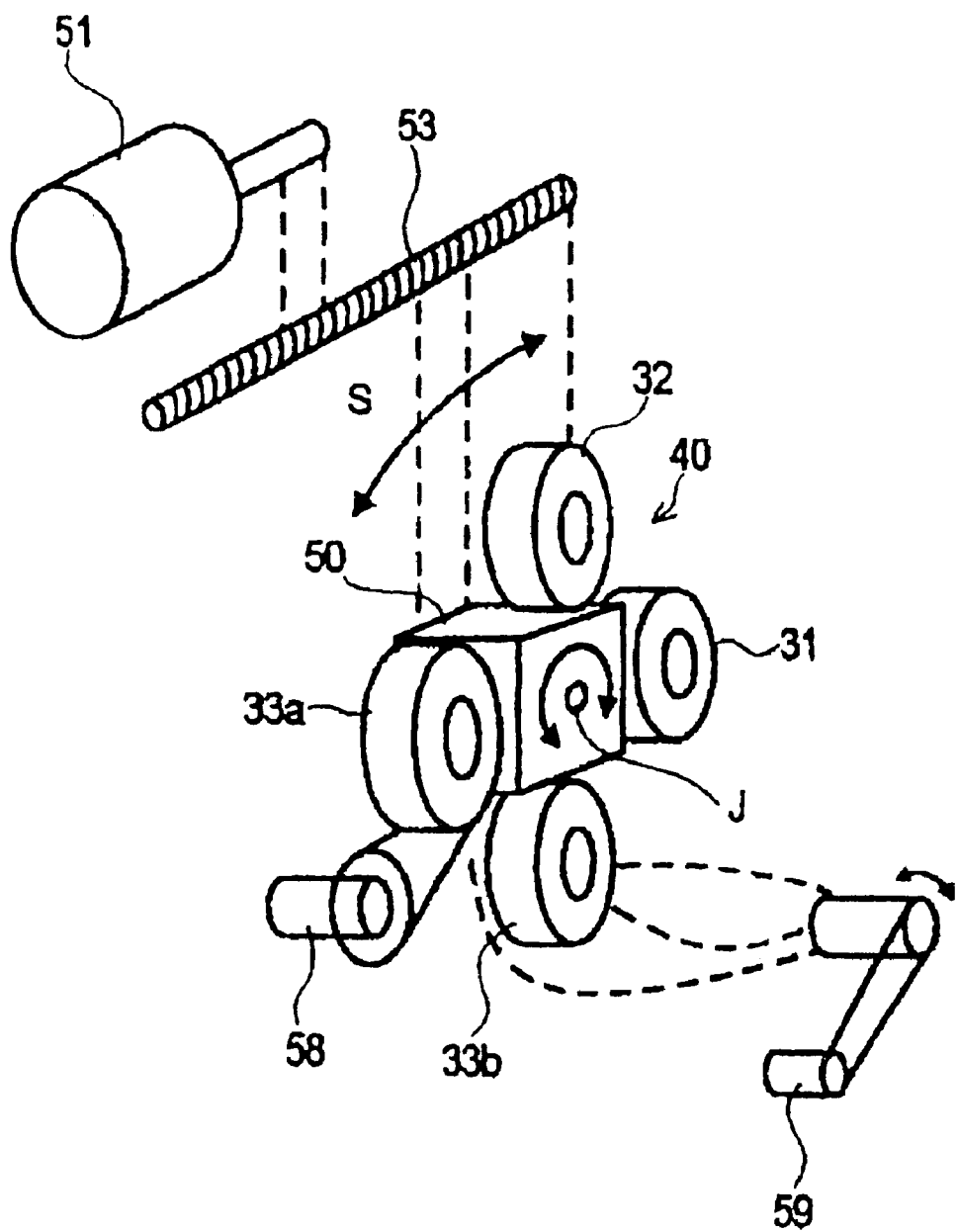
FIG. 8 is a schematic diagram of a roller unit composed of a turret.
Figure 9:
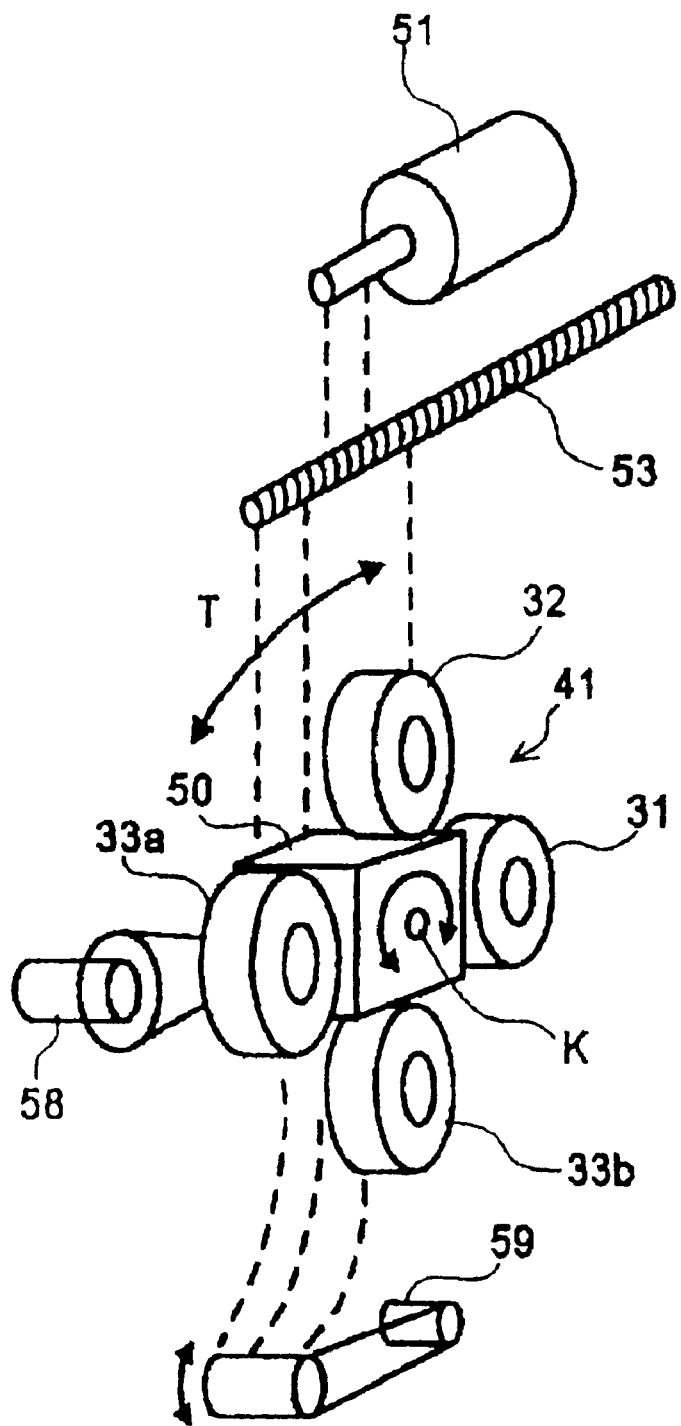
FIG. 9 is a schematic diagram of a roller unit composed of a turret.

FIGS. 8 and 9 each shows a roller unit including a plurality of rollers (e.g., a thickening roller 31, a pressing roller 32, a rough forming roller 33b and a finishing roller 33a). Each roller is radially supported on a roller frame 50 in a rotatable manner. The roller frame 50 forms a turret 40, 41. The turret 40, 41 is supported on the periphery of the mandrel about the axis J, K that is in parallel with the axis of the mandrel. By rotating the turret with a motor, the selected roller faces the mandrel 3.

The turret 40, 41 is connected to a ball screw 53. The ball screw 53 is rotated with a motor 51. Thus, the turret 40, 41 swings in the direction S, T, so that the selected roller is moved toward or away from the mandrel. Incremental encoders 58 and 59 are also provided. The incremental encoder 58 detects the rotation position of the turret 40, 41, that is, which roller is at the operating position. The incremental encoder 59 detects the radial position of that roller relative to the mandrel 3.

The roller units composed of the turrets 40, 41 may be movable in the R-axis and Q-axis directions shown in FIG. 5(a), respectively. However, it is preferable to arrange three such turrets on the same plane so as to cancel the radial loads applied to the mandrel 3. More specifically, the rollers in the roller units composed of the turrets act on the mandrel 3 in the P, Q and R-axis directions shown in FIG. 5(a), respectively, and the roller unit for the bending roller 30 shown in FIG. 7 is arranged on a plane different from the plane on which the roller units composed of the turrets are arranged.

This manufacturing apparatus moves the mandrel 3 in the axial direction (the direction Z) while rotating it, and moves the rollers 30, 31, 32, 33a, 33b in the radial direction. By controlling the timing and speed of such axial and radial movements, the rollers can be moved according to the shape of the mandrel in an arbitrarily manner. The turrets 40, 41 can be sequentially rotated based on the work procedure so that a required roller faces the mandrel 3 at an operating position. Thus, a cylindrical member can be efficiently manufactured in an automated manner.

Hereinafter, an embodiment that is applicable to a cylindrical member having no enlarged diameter portion like the aforementioned front cover will be described with reference to FIGS. 10(a) to 10(d). According to the manufacturing method of the invention, the blank is partially thickened with the intermediate portion thereof supported on the increased diameter portion of the mandrel. The manufacturing method of the invention is thus preferably used to manufacture a product having an enlarged diameter portion like the front cover. However, by using a mandrel having a movable increased diameter portion, the manufacturing method of the invention is also applicable to a cylindrical member having no large stepped portion like a C1 clutch drum described in Japanese Laid-Open Publication No. 9-21448 and an underdrive drum described in Japanese Laid-Open Publication No. 11-82647.

Figure 10A:
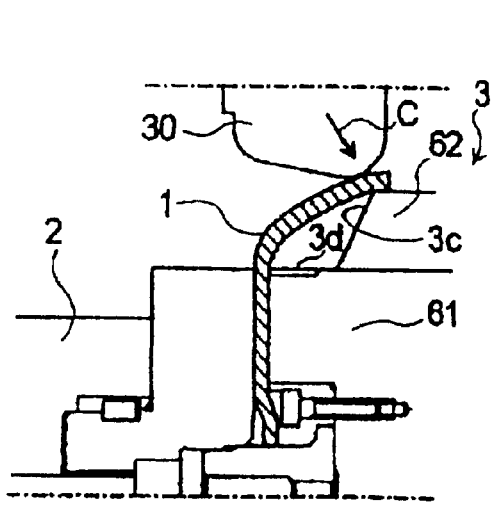

The mandrel 3 used in this manufacturing method includes a mold body 61 and a movable portion 62 having an increased diameter portion 3c. The movable portion 63 is movable on the mold body 61 in the axis direction. First, with the movable portion 62 being fixed at a predetermined position near a columnar portion 3d of the mold body 61, the blank 1 is fixedly mounted between the mandrel 3 and the tailstock 2, as shown in FIG. 10(a). The blank 1 is then bent onto the movable portion 62 by using the bending roller 30.

Figure 10B:
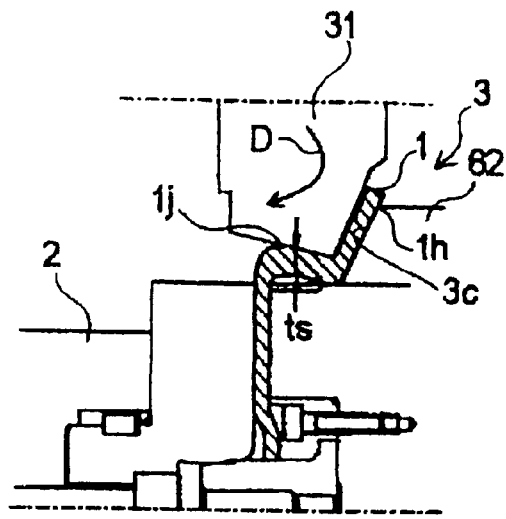

As shown in FIG. 10(b), with the intermediate portion 1h of the blank 1 being supported on the increased diameter portion 3c of the movable portion 62 of the mandrel, the thickening roller 31 is then moved in the direction D relative to the mandrel so as to partially thicken the blank 1.

Figure 10C:
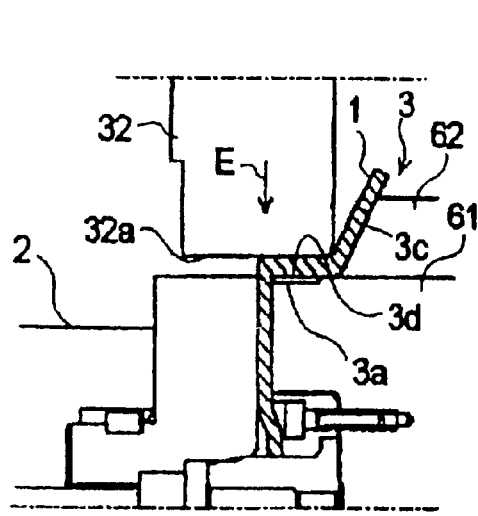

The thickening step shown in FIG. 10(b) and the profiling (pressing) step of FIG. 10(c) are the same as those described above with reference to FIGS. 1(a), 1(b), 1(c), FIGS. 2(a), 2(b), 2(c) and FIG. 3(a).

Figure 10D:
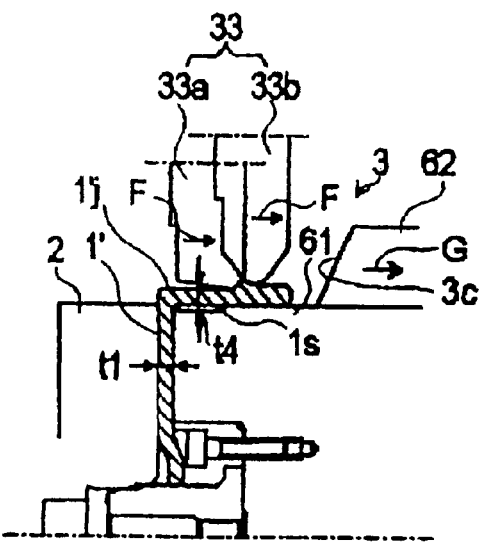

As shown in FIG. 10(d), the movable increased diameter mold 62 is moved away from the columnar portion 3d of the mold body 61 in the axial direction as shown by an arrow G. At this position, the movable portion 62 withdraws from formation of the blank 1 and will not contact the blank 1. The flow forming process is conducted in this state. In the flow forming process, the forming roller 33 is moved in the direction F along the outer surface of the mold body 61. Thus, the blank 1 is formed and the thickened portion 1j is pressed into the tooth spaces 3a so as to form the splines 1s. This flow forming process is conducted a plurality of times by using different rollers such as a rough roller 33b and a finishing roller 33a for high accuracy. In the cylindrical member 1' thus produced, a thickened portion 1'j having a thickness t4 larger than the thickness t1 of the blank is formed in the cylindrical portion, and the inner splines 1s are reliably formed in the thickened portion with high accuracy.

The aforementioned cylindrical member may be formed by the method shown FIGS. 12(a) to 12(c). However, the aforementioned method for partially thickening the blank requires only a small amount of load, allowing improvement in the lifetime of the rollers. This method also reduces the energy required for the processing, and also suppresses work-hardening and degradation of the material caused by the reduced material flow, thereby allowing improvement in the yield.

According to the manufacturing method using the movable portion, the following cylindrical members can be formed: a cylindrical member having a splineless thickened portion 1m at its inner periphery as shown in FIG. 11(a); a cylindrical member having a splineless thickened portion 1m at its outer periphery as shown in FIG. 11(b); a cylindrical member having a thickened portion 1m at its inner periphery and also having inner splines 1s at the inner peripheral surface of the thickened portion as shown in FIG. 11(c); and a cylindrical member having a thickened portion 1m at its outer periphery and also having inner splines 1s at the inner peripheral surface as shown in FIG. 11(d). However, the invention is not limited to these shapes, and the manufacturing method and manufacturing apparatus of the invention are applicable to any other cylindrical shapes requiring partial thickening.

(Second Embodiment)

In the second embodiment of the invention, a projecting portion of the boundary between the flat portion 12a (the flat portion 1a of the blank 1) and the enlarged diameter portion 12c (the enlarged diameter portion 1c of the blank 1) of the finished front cover 12, that is, a projecting portion of the R portion a (see FIG. 13), is referred to as a corner (intersection) 12N, and a portion corresponding to the corner 12N in the blank 1 is referred to as a corner 1N. The second embodiment is characterized in that an underfill portion β is actively provided in a portion corresponding to the corner 1N in the aforementioned thickening step.

The reason for this will now be described.

Figure 16A:
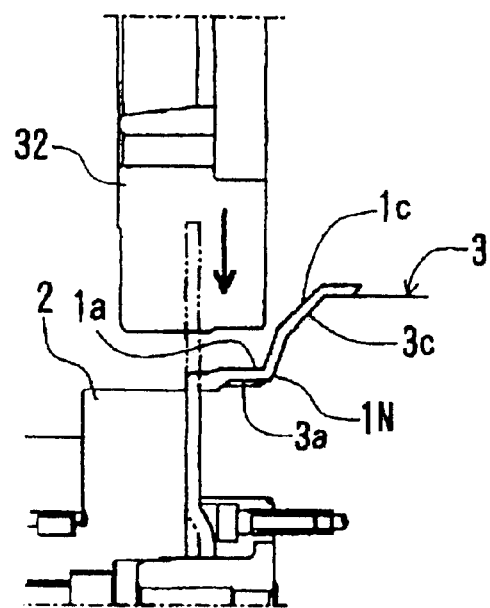
FIGS. 16(a) and 16(b) are diagrams showing the pressing step in the second embodiment.
Figure 16B:
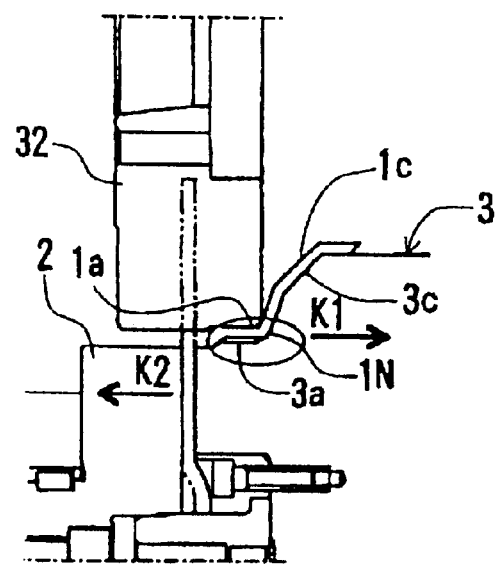

FIGS. 15(a), 15(b), 15(c) and 15(d) show the thickening step of the embodiment. FIGS. 16(a) and 16(b) show the pressing (profiling) step of the embodiment. FIGS. 17(a), 17(b), 17(c) and 17(d) show the forming (flow forming) step of the embodiment.

As shown in FIG. 15(a), the boundary between the bottom 12b and the flat portion 12a in the finished front cover 12 is herein referred to as a shoulder portion 12e, and a portion corresponding to the shoulder portion 12e in the blank 1 is herein referred to as a shoulder portion 1e. If no underfill portion β is provided at the corner 1N of the blank 1, the following problem will occur in the pressing step shown in FIGS. 16(a) to 16(b): as shown in FIG. 16(b), the pressing roller 32 presses the outer peripheral surface of the flat portion 1a in the radially inward direction so that the material at the inner peripheral surface of the flat portion 1a is forced into the tooth spaces 3a of the columnar portion 3d of the mandrel 3. At this point, the material flow in the direction K1 (the direction toward the corner N1) is blocked by the increased diameter portion 3c. However, the material flow in the direction K2 (the direction toward the shoulder portion 1e) is not blocked, whereby the material is likely to flow in the direction K2. Therefore, the shoulder portion 1e moves in the direction K2, so that the bottom 1b (the portion corresponding to the bottom 12b of the front cover 12 in the blank 1) is curved in the direction K2 at its outer periphery. Such curving of the bottom 1b also occurs in the forming step of FIGS. 17(a) to 17(d). As shown in FIG. 17(a), the forming roller 33 is moved in the direction K1 while pressing the flat portion 12a in the radially inward direction. In this case as well, curving of the bottom 1b is likely to occur due to the same mechanism. Even when the pressing step is not required for the processing, moving the forming roller 33 causes curving of the bottom 1b. Note that such curving of the bottom 1b is noticeably produced when the tailstock 1 is not used.

In the embodiment, the underfill portion β is actively produced at the corner 1N of the blank 1 in the thickening step in order to prevent such curving of the bottom 1b. The thickening step will now be described in detail with reference to FIGS. 15(a) to 15(d).

As shown in FIG. 15(a), the thickening roller 31 is moved in the direction shown by the arrow so as to press the radially outer portion of the enlarged diameter portion 1c of the blank 1 against the increased diameter portion 3c of the mandrel 3. As shown in FIG. 15(b), the thickening roller 31 is then moved along the enlarged diameter portion 1c in the radially inward direction (toward the columnar portion 3d of the mandrel 3) while pressing the enlarged diameter portion 1c against the increased diameter portion 3c. Thus, the material at the enlarged diameter portion 1c is accumulated on the flat portion 1a. In this embodiment, the material is prevented from completely (100%) filling the space at the intersection 3e of the increased diameter portion 3c and the columnar portion 3d of the mandrel 3 when the thickening roller 31 reaches the R portion at the boundary between the enlarged diameter portion 1c and the flat portion 1a (that is, reaches the position shown in FIG. 15c). In other words, a void α having no material filled therein is formed (see FIG. 18). The underfill portion β corresponding to the void α is thus formed at the corner 1N, that is, at the intersection of the enlarged diameter portion 1c and the flat portion 1a. As shown in FIGS. 15(c) and 15(d), the thickening roller 31 is then moved to the direction K2 toward the shoulder portion 1e. As a result, the shoulder portion 1e is thickened so as to increase the part strength. The thickening step is thus completed.

Hereinafter, formation of the void α in the thickening step will be described with reference to FIG. 18.

Figure 18:
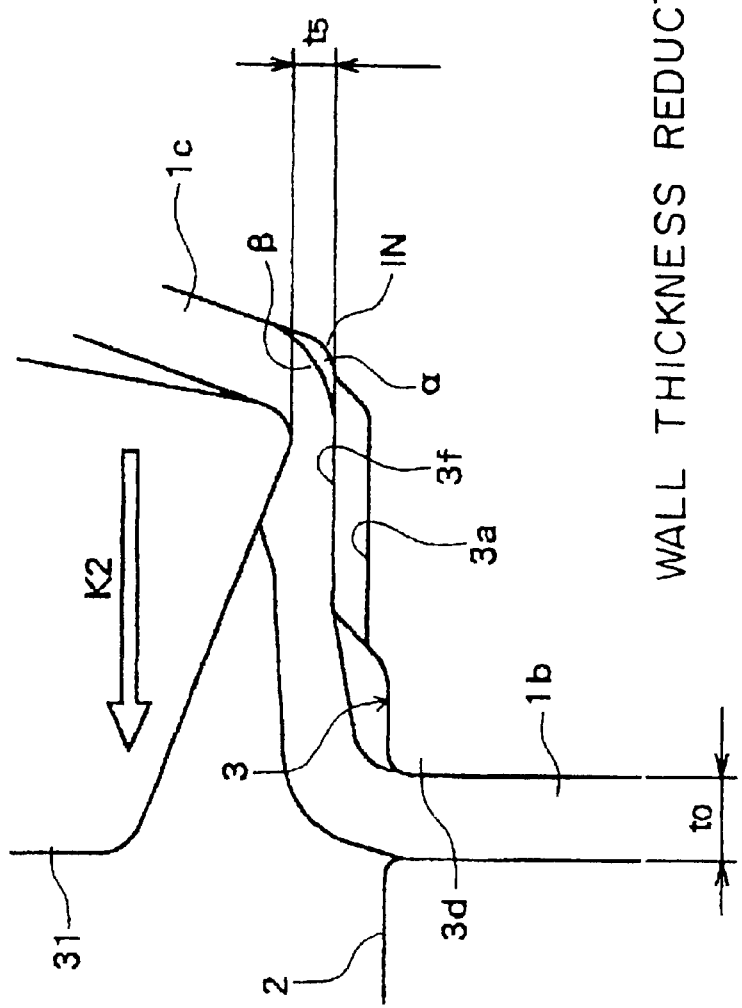
FIG. 18 is an enlarged view illustrating a void α (underfill portion β)

As shown in FIG. 18, the thickness at the bottom 1b of the blank 1 is herein referred to as original blank thickness $t_o$, the thickness from the tooth tip 3f of the mandrel 3 to the outer peripheral surface of the flat portion 1a is referred to as thickness of splined large-diameter portion, $t_S$. In this case, the reduction rate of the wall thickness, $R_o$, is defined by the following equation:

$$R_o = (t_o - t_S)/t_o.$$

By moving the thickening roller 31 so that the reduction rate $R_o$ falls within the range of 0.003 to 0.15, a predetermined void α is formed. Note that the reduction rate of the wall thickness in the final product is about 0.375. In other words, the void α, i.e., the underfill portion β, is provided so that the reduction rate of the wall thickness after completion of the thickening step is smaller than that in the final product. Note that the reduction rate of the wall thickness slightly varies depending on the factors such as the size of the product and the material and hardness of the blank. Therefore, the reduction rate of the wall thickness may be appropriately set to an optimal value by experimentation or the like.

Then, the processing proceeds to the pressing step shown in FIGS. 16(a) and 16(b).

As shown in FIG. 16(a), the pressing roller 32 is moved in the radially inward direction (the direction shown by the arrow). As shown in FIG. 16(b), the pressing roller 32 thus presses the outer peripheral surface of the flat portion 1a in the radially inward direction so that the material at the inner peripheral surface of the flat portion 1a is forced into the tooth spaces 3a of the columnar portion 3d of the mandrel 3. At this point, the void α provided in the thickening step facilitates the material flow in the direction K1 into the void α. As a result, the material can be completely prevented from flowing in the direction K2 toward the shoulder portion 1e, or the amount of the material flowing in the direction K2 toward the shoulder portion 1e can be significantly reduced, whereby curving of the bottom 1b can be effectively prevented. Note that, in this pressing step, the tooth spaces 3a are filled with the material to 30% to 50%. Accordingly, the void α formed in the thickening step is reduced in volume, but will not completely be eliminated, in this pressing step.

The processing then proceeds to the forming step as shown in FIGS. 17(a) to 17(d).

As shown in FIG. 17(a), the forming roller 33 is first moved in the direction K1 while pressing the flat portion 1a. As a result, the material moves in the direction K1, filling the tooth spaces 3a. The tooth spaces 3a and the void α are thus completely (100%) filled with the material. As shown in FIGS. 17(b), 17(c) and 17(d), the forming roller 33 is then moved along the enlarged diameter portion 1c for overall formation. The front cover 12 is thus completed as a product. Since the void α is not completely eliminated in the pressing step, the material smoothly flows in the direction K1 in the forming step as well, and does not flow backward. Accordingly, curving of the bottom 1b can be prevented.

Note that, in the foregoing description, the thickening, pressing and forming steps are sequentially conducted in this order. However, either the pressing step or the forming step may be omitted depending on the product. In the case where the forming step is omitted, the tooth spaces 3a are completely (100%) filled with the material in the pressing step.

For example, in this case, this pressing step may be conducted by using two pressing rollers 32. In the case where the pressing step is omitted, the tooth spaces 3a are completely (100%) filled with the material in the forming step. For example, in this case, the steps shown in FIGS. 17(a) and 17(b) may be conducted by using two forming rollers 33, and the steps of FIGS. 17(c) and 17(d) may be conducted by using one of the two forming rollers 33. Whichever of the pressing step and the forming step is omitted, the void a needs only be formed in the thickening step. Thus, approximately the same effect as that in the case where both steps are conducted can be obtained in terms of the curving of the bottom 1b.

Note that, the embodiment can achieve the proper effects in combination with the first embodiment. For example, in the case where the embodiment in combination with the first embodiment is applied to FIGS. 10(a) to 10(d), curving of the bottom 1b can be effectively prevented even when a high-tooth component is processed.

(Third Embodiment)

Figure 19A:
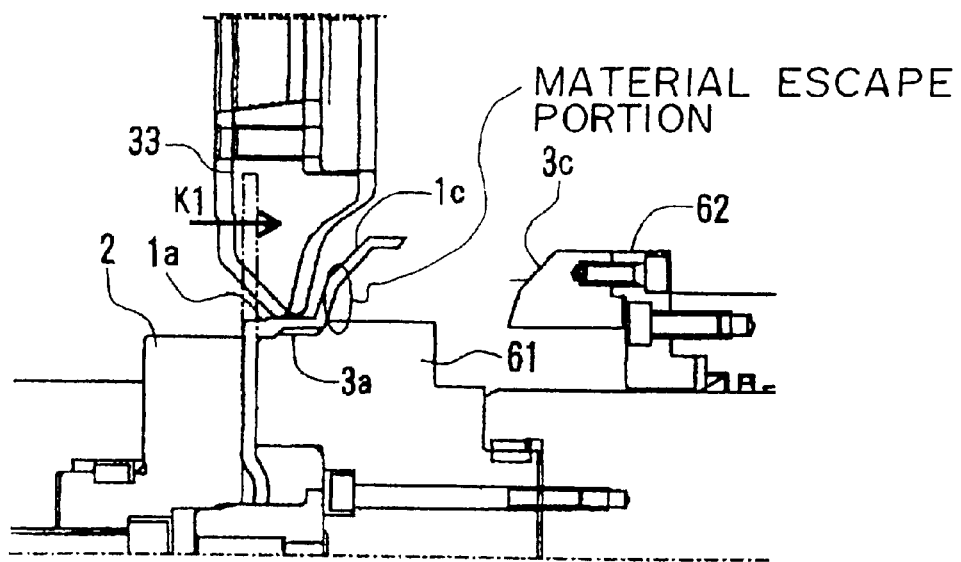
FIGS. 19(a) and 19(b) are diagrams showing the forming step in a third embodiment of the invention.
Figure 19B:
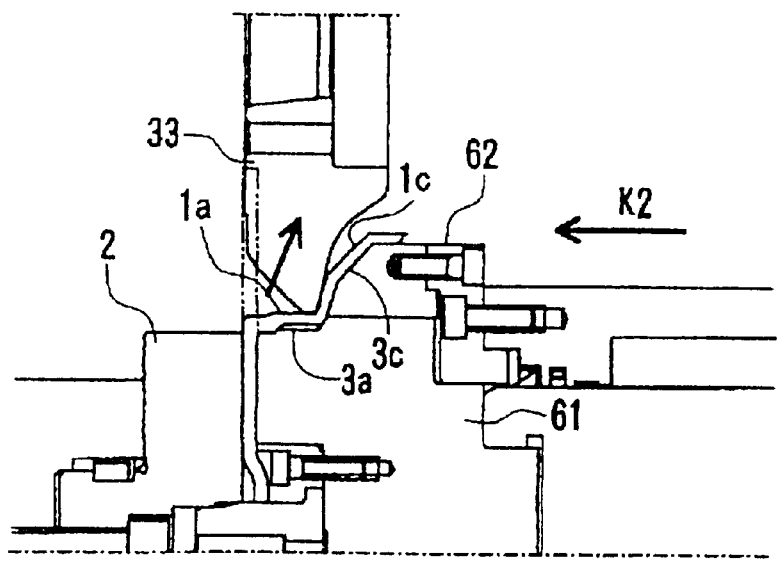

FIGS. 19(a) and 19(b) illustrate an embodiment for manufacturing a high-tooth product having a stepped portion (enlarged diameter portion) by applying the technique of the second embodiment.

As in the first embodiment shown in FIGS. 10(a) to 10(d), the mandrel 3 in the third embodiment has a mold body 61, and a movable portion 62 having an increased diameter portion 3c. The movable portion 62 is movable on the mold body 61 in the axial direction. The tooth spaces 3a in the third embodiment are made deeper than those in the first and second embodiments in order to manufacture a product having an increased tooth height.

In the embodiment as well, the void a is provided in the thickening step prior to the forming step shown in FIGS. 19(a) and 19(b). The thickening step is the same as that shown in FIGS. 15(a) to 15(d).

As shown in FIG. 19(a), in the early stage of the forming step, the void α is formed. In addition, the movable portion 62 is withdrawn in order to provide an escape portion for the material. Thus, when the forming roller 33 is moved in the direction K1, the material smoothly flows in the direction K1 into the void α and the escape portion, whereby backflow of the material can be prevented. As a result, curving of the bottom 1b can be prevented.

As shown in FIG. 19(b), when the forming roller 33 gets closer to the enlarged diameter portion 1c in the latter stage of the forming step, the movable portion 62 is advanced in the direction K2 up to the position shown in the figure, thereby forming the enlarged diameter portion 1c.

According to the embodiment, the segmented mandrel 3 is used and the void α (underfill portion β) is provided in the thickening step. This allows accurate formation of the high-tooth product without causing curving of the bottom 1b.

(Fourth Embodiment)

Figure 26A:
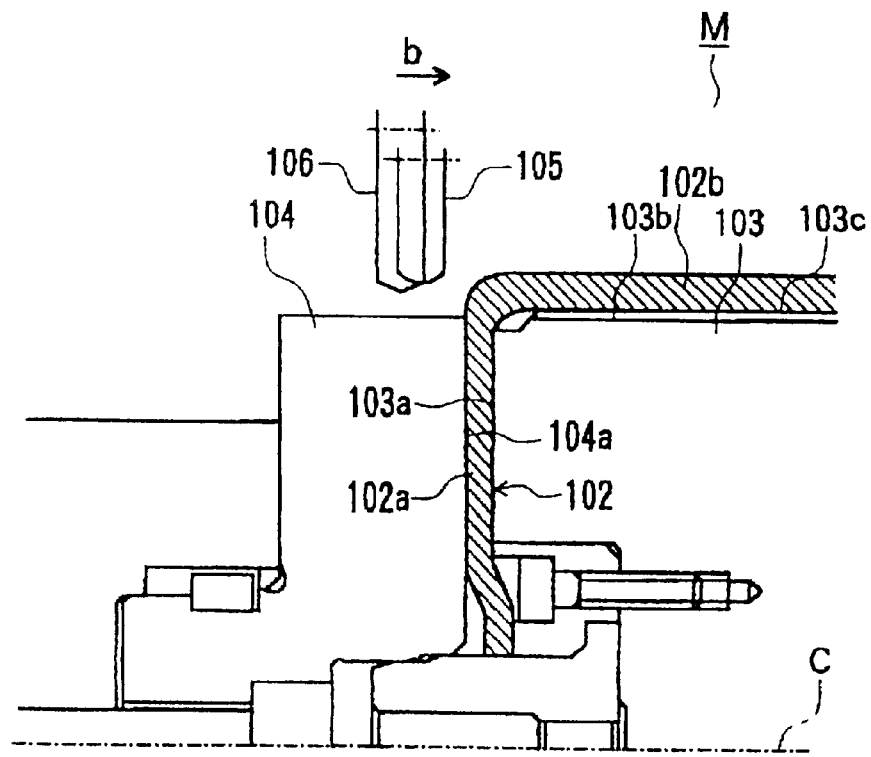
FIGS. 26(a) and 26(b) are diagrams illustrating a conventional method and apparatus for manufacturing a cylindrical member.
Figure 26B:
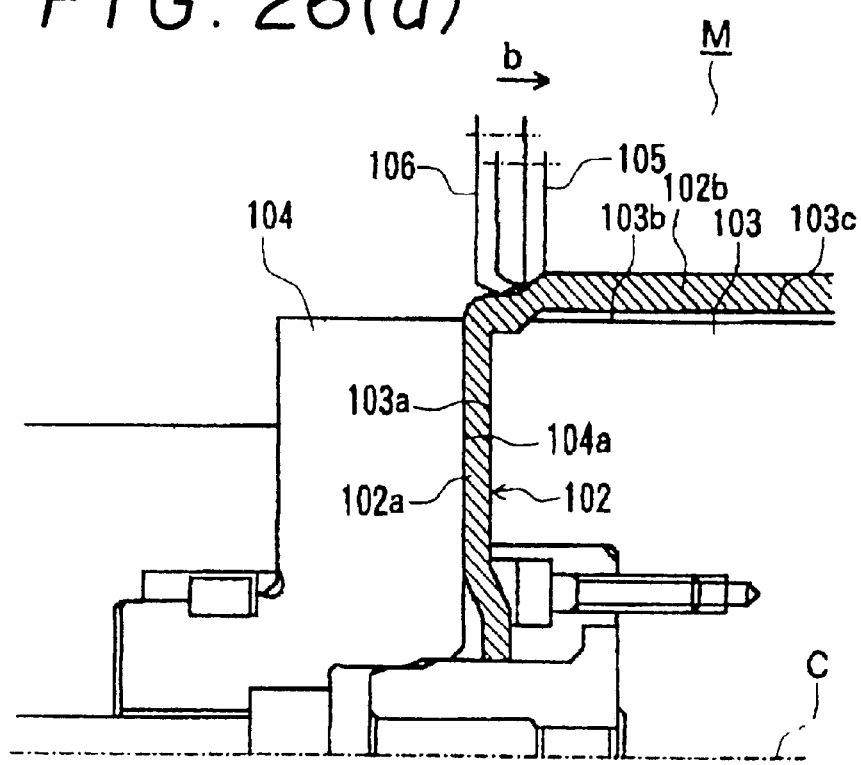

FIGS. 26(a) and 26(b) illustrate a conventional method and apparatus for manufacturing a cylindrical member, which are used to form a disk-shaped blank into a cylindrical member having a bottom and a cylindrical portion. Note that FIGS. 26(a) and 26(b) are partial longitudinal cross-sections taken along the line extending through the common central axis C of a cup-shaped member 102, a mandrel 103 and a fixing means 104. The cup-shaped member 102 is an intermediate product, that is, the disk-shaped blank whose outer peripheral side is bent so as to have a bottom 102a and a cylindrical portion 102b. A cylindrical member as a product is herein manufactured by further forming the cup-shaped material 102, i.e., the intermediate product.

As shown in FIG. 26(a), the manufacturing apparatus M includes a mandrel 103, a fixing means 104, and roller members 105, 106. The cylindrical mandrel 103 is mounted inside the cup-shaped member 102 so that the bottom 102a of the cup-shaped member 102 is fixedly held between an end face 103a of the mandrel 103 and a holding surface 104a of the fixing means 104. At this point, the cylindrical portion 102b surrounds an outer peripheral surface 103b of the mandrel 103. In this state, the mandrel 103 and the fixing means 104 are rotated about the central axis C in order to rotate the cup-shaped member 102. Then, two forming rollers 105, 106 are moved along the central axis C in the direction b from the bottom 102a toward a not-shown open end of the cylindrical portion (which is located rightward in the figure), while pressing the outer peripheral surface of the cylindrical portion 102b toward the outer peripheral surface 103b of the mandrel 103. Thus, the cylindrical portion 102b can be formed into a desired shape. For example, in the case where tooth portions 103c are formed in the outer peripheral surface 103b of the mandrel 103, the inner peripheral surface of the cylindrical portion 102b can be pressed into the tooth portions 103c so as to form internal teeth.

Figure 27:
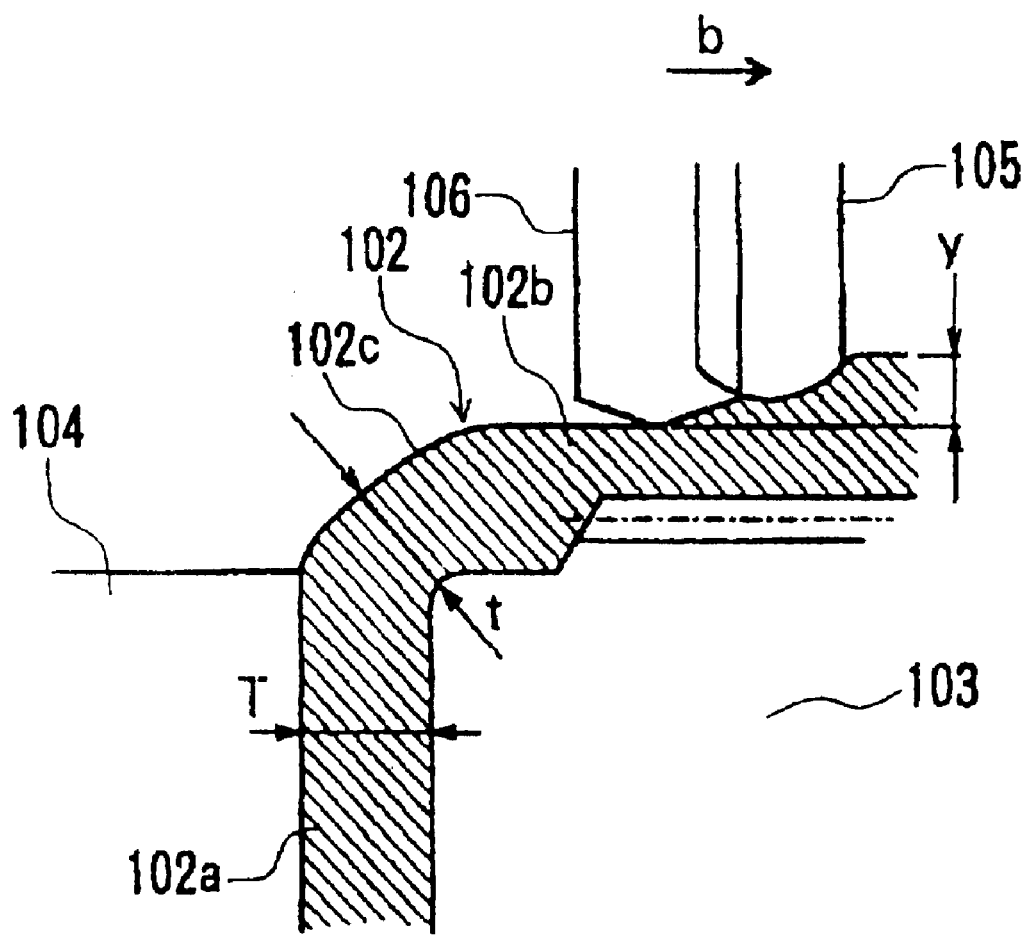
FIG. 27 is a diagram illustrating how the thickness of the shoulder portion is reduced.

However, the use of the aforementioned manufacturing method and manufacturing apparatus M for forming a cylindrical member causes the following problem: as shown in FIG. 27, with the movement of the forming rollers 105, 106 in the direction b, the material at the outer periphery of the joint 102c between the bottom 102a and the cylindrical portion 102b (hereinafter, referred to as shoulder portion 102c) is moved toward the open end of the cylindrical portion 102b. Therefore, in the thus-formed cylindrical member, the thickness t of the shoulder portion 102c becomes smaller than the thickness T of the bottom 102a, resulting in reduced strength of the shoulder portion 102c.

One countermeasure against such a problem is to reduce a squeeze amount y, that is, the difference in outer diameter of the cylindrical portion 102b of the cup-shaped member 102 before and after the formation. In this method, however, it is impossible to force the material at the inner periphery of the cylindrical portion 102 sufficiently into the tooth portions 103c at the outer peripheral surface 3b of the mandrel 103, thereby possibly degrading the processing accuracy of the inner teeth after formation. Note that such reduction in the squeeze amount y can somewhat relieve the problem of the reduced thickness t of the shoulder portion 102c. However, since the forming rollers 105, 106 are moved in the direction b from the bottom 102a toward the open end, it is difficult to completely prevent reduction in thickness of the shoulder portion 102c.

Figure 28:
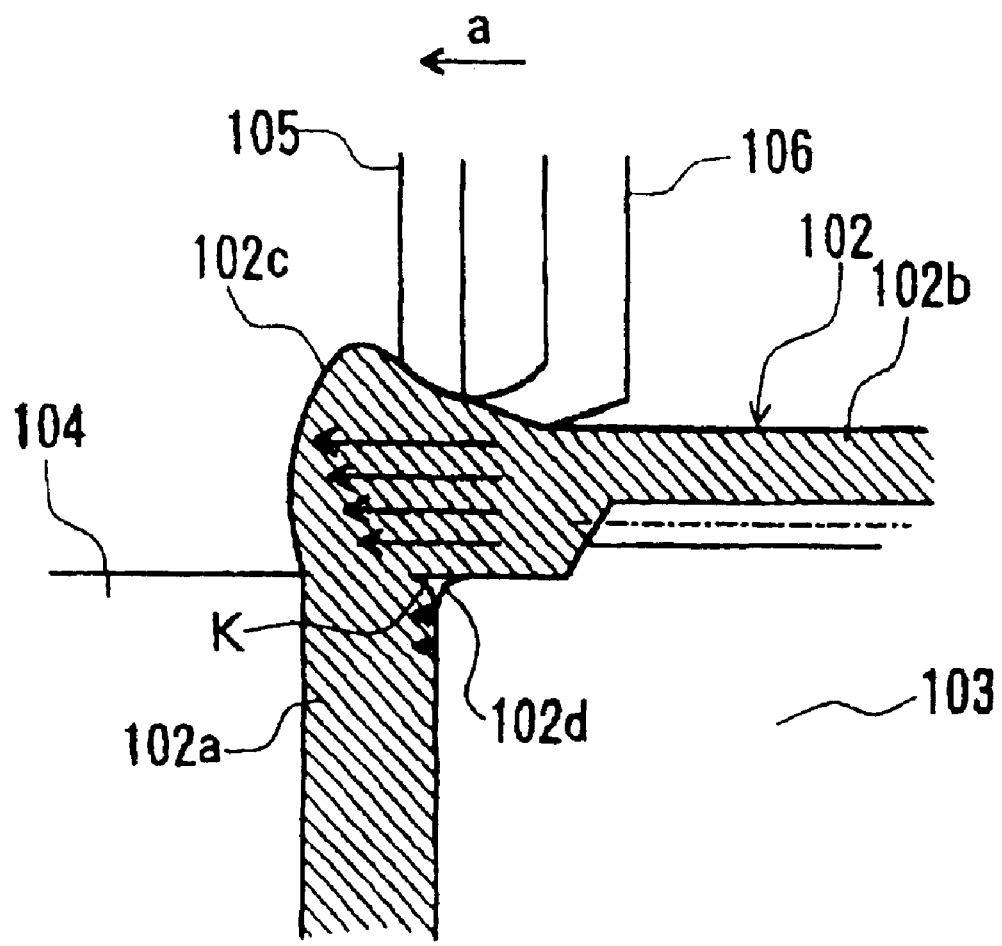
FIG. 28 is a diagram illustrating how a lap is generated at a root portion of the shoulder portion.

Thus, as shown in FIG. 28, the forming rollers 105, 106 may be moved in the opposite direction, i.e., in the direction a from the open end toward the bottom 102a.

In this case, the material at the outer peripheral surface of the cylindrical portion 102b can be moved toward the shoulder portion 102c. Therefore, reduction in thickness of the shoulder portion 102c can be effectively prevented.

However, when the forming rollers 105, 106 are moved in the direction a, a lap K may be produced at the inner part 102d of the shoulder portion 102c (hereinafter, it is referred to as "root portion"), resulting in reduction in strength of the shoulder portion 102c. The reason for this is as follows: as shown in FIG. 28, with the movement of the forming rollers 105, 106, the material moves in the same direction (the direction a). Since the material is not restricted at the left end thereof, the flow rate of the material near the shoulder portion 102c becomes higher toward the outer peripheral surface of the cylindrical portion 2b and lower toward the root portion 102d. At the location inside the root portion 102d, the flow rate of the material is almost zero. This results in a large difference in flow rate between inside and outside of the root portion 102d, generating the lap K.

The embodiment provides a method and apparatus for manufacturing a cylindrical member, capable of preventing reduction in thickness of the shoulder portion and generation of the lap at the root portion so as to prevent reduction in strength of the shoulder portion.

Figure 20:
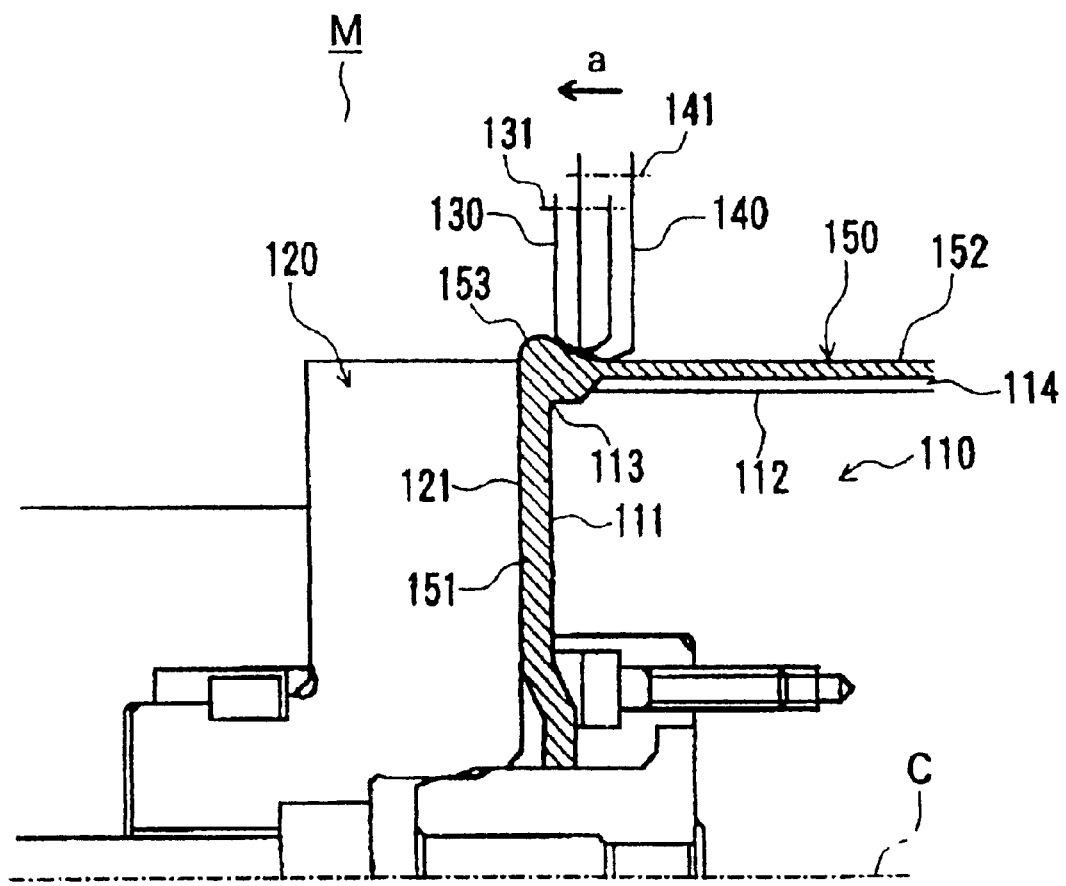
FIG. 20 is a partial longitudinal cross-sectional view showing the schematic structure of an apparatus for manufacturing a cylindrical member according to a fourth embodiment of the invention.

FIG. 20 shows an example of the apparatus for manufacturing a cylindrical member according to the embodiment (hereinafter, it is simply referred to as a manufacturing apparatus M). FIG. 20 is a partial longitudinal cross section of the manufacturing apparatus M along the plane extending through its central axis C.

A cup-shaped member 150 to be formed by the manufacturing apparatus M of FIG. 20 is a disk-shaped blank whose radially outer portion is bent by approximately 90° so as to have a bottom 151 and a cylindrical portion 152 (i.e., a semi-finished product). A shoulder portion 153 is formed at the bent portion, that is, at the joint between the bottom 151 and the cylindrical portion 152. An open end (not shown) is formed on the opposite side of the cylindrical portion 152 (rightward in the figure), that is, on the side opposite to that of the shoulder portion 153.

The manufacturing apparatus M for forming such a cup-shaped member 150 includes a mandrel 110, a fixing means 120 and forming rollers 130, 140.

The mandrel 110 generally has an approximately columnar shape, and includes a planar end face 111 and an outer peripheral surface 112. The bottom 151 of the cup-shaped portion 150 is held between the end face 111 and a holding surface 121 of the fixing means 120 described below. The interconnection of the end face 111 and the outer peripheral surface 112 is herein referred to as a ridge portion 113. At the outer peripheral surface 112, tooth portions (external teeth) 114 extend from the position slightly on the right of the ridge portion 113 in the figure. The mandrel 110 is mounted inside the cup-shaped member 150 such that the end face 111 abuts on the inner surface of the bottom 151 as well as the outer peripheral surface 112 is located immediately inside the cylindrical portion 152. The mandrel 110 is rotatable about the central axis C.

Figure 21:
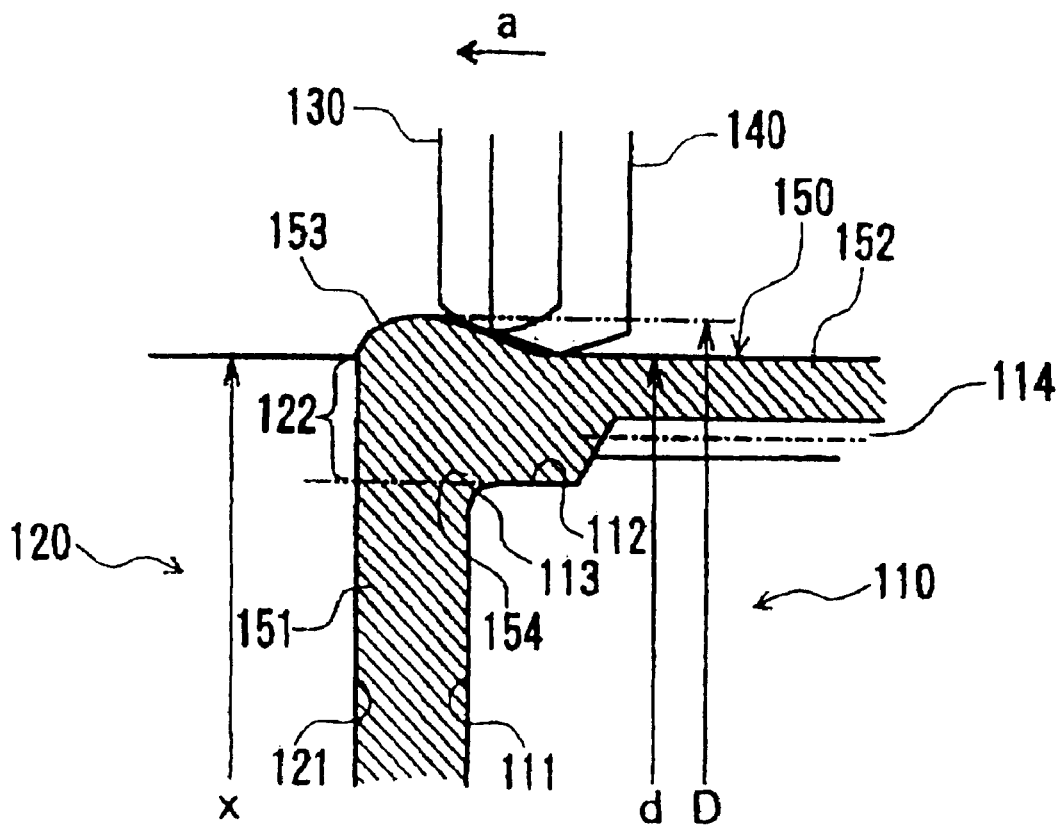
FIG. 21 is a longitudinal cross-sectional view of a portion near a shoulder portion of a cup-shaped member according to the fourth embodiment of the invention.

The fixing means (fixing member) 120 is located outside the cup-shaped member 150. The fixing means 120 has a holding surface 121 facing the end face 111 of the mandrel 110. The holding surface 121 in the embodiment is a planar surface, and the bottom 151 of the cup-shaped member 150 is held between the holding surface 121 of the fixing means 120 and the end face of the mandrel 110. The holding surface 121 has an annular regulating portion 122 at the outer periphery (see FIG. 21). FIG. 21 is an enlarged view of the cup-shaped member 150 near the shoulder portion 153. As shown in FIG. 21, the portion of the holding surface 121 located outside the ridge portion 113 of the mandrel 110 forms the annular regulating portion 122. In the embodiment, the outer diameter x of the regulating portion 122 (which is the same as the outer diameter of the holding surface 121) is smaller than the outer diameter D of the cylindrical portion 152 of the cup-shaped member 150 prior to formation with the forming rollers 130, 140 described below. The outer diameter x of the regulating portion 122 is equal to or larger than the outer diameter d of the cylindrical portion 152 after formation with the forming rollers 130, 140. In other words, the outer diameter x of the regulating portion 122 is set to $d \leq x < D$. The outer diameter D is shown by the two-dotted chain line in FIG. 21, and the outer diameter d is shown by the solid line in FIG. 21. It should be noted that, in view of the fact that the forming rollers 130, 140 are moved in the direction a along the central axis C, the outer diameter x of the regulating portion 122 is preferably set to a value approximately equal to the outer diameter d of the cylindrical portion 152 after formation. Like the mandrel 110, the fixing member 120 is also rotatable about the central axis C.

The forming rollers 130, 140 are supported rotatably about their respective central axes 131, 141 (see FIG. 20). The central axes 131, 141 are in parallel with the central axis C. The forming rollers 130, 140 are a rough-processing roller and a finishing roller, respectively. The outer periphery of the forming roller 140 slightly projects toward the cup-shaped member with respect to the outer periphery of the forming roller 130. The forming rollers 130, 140 are movable both in the direction a (the direction from the open end of the cylindrical portion 152 toward the bottom 151) and the opposite direction along the central axis C.

Hereinafter, the operation of the thus-structured manufacturing apparatus M, that is, the manufacturing method of the cylindrical member according to the invention (hereinafter, simply referred to as "manufacturing method"), will be described.

The mandrel 110 is placed inside the cup-shaped member 150. The bottom 151 of the cup-shaped member 150 is held between the end face 111 of the mandrel 110 and the holding surface 121 of the fixing means 120.

With the cup-shaped member 150 being held as such, the mandrel 110 and the fixing member 120 are rotated so as to rotate the cup-shaped member 150.

At the open end of the cylindrical portion 152 of the cup-shaped member 150, the forming roller 130, 140 are pressed into the outer peripheral surface of the cylindrical portion 152 by a predetermined squeeze amount (i.e., D-d) so as to press the cylindrical portion 152 against the outer peripheral surface 112 of the mandrel 110. In this state, the forming rollers 130, 140 are moved in the direction a, whereby the material at the outer peripheral surface of the cylindrical portion 152 is sequentially moved downstream of the forming rollers 130, 140. At the same time, the material at the inner peripheral surface of the cylinder portion 152 is sequentially forced into the tooth portions 114 of the mandrel 110.

When the forming rollers 130, 140 get close to the shoulder portion 153 of the cup-shaped member 150, a sufficient amount of material is moved to the shoulder portion 153. Therefore, the thickness t (see FIG. 27) of the shoulder portion 153 will not be reduced. Moreover, when the forming rollers 130, 140 get close to shoulder portion 153, the regulating portion 122 of the fixing means 120 regulates the material flow. This prevents the lap K (see FIG. 28) from being produced at the root portion 154 (which is an inner portion of the shoulder portion 153, and corresponds to the ridge portion 113 of the mandrel 110). This is because the regulating portion 122 is capable of reducing the difference in flow rate of the material between inside and outside of the root portion 154.

Thus, according to the embodiment, both reduction in thickness of the shoulder portion 153 and generation of the lap at the root portion 154 can be effectively prevented.

Note that, in the foregoing description, the manufacturing apparatus M of the invention forms the cup-shaped member into a cylindrical member. However, the manufacturing apparatus M may conduct a step of forming a disk-shaped blank into the cup-shaped member 150.

An additional forming roller may be provided in addition to the two forming rollers 130, 140.

(Fifth Embodiment)

Figure 22:
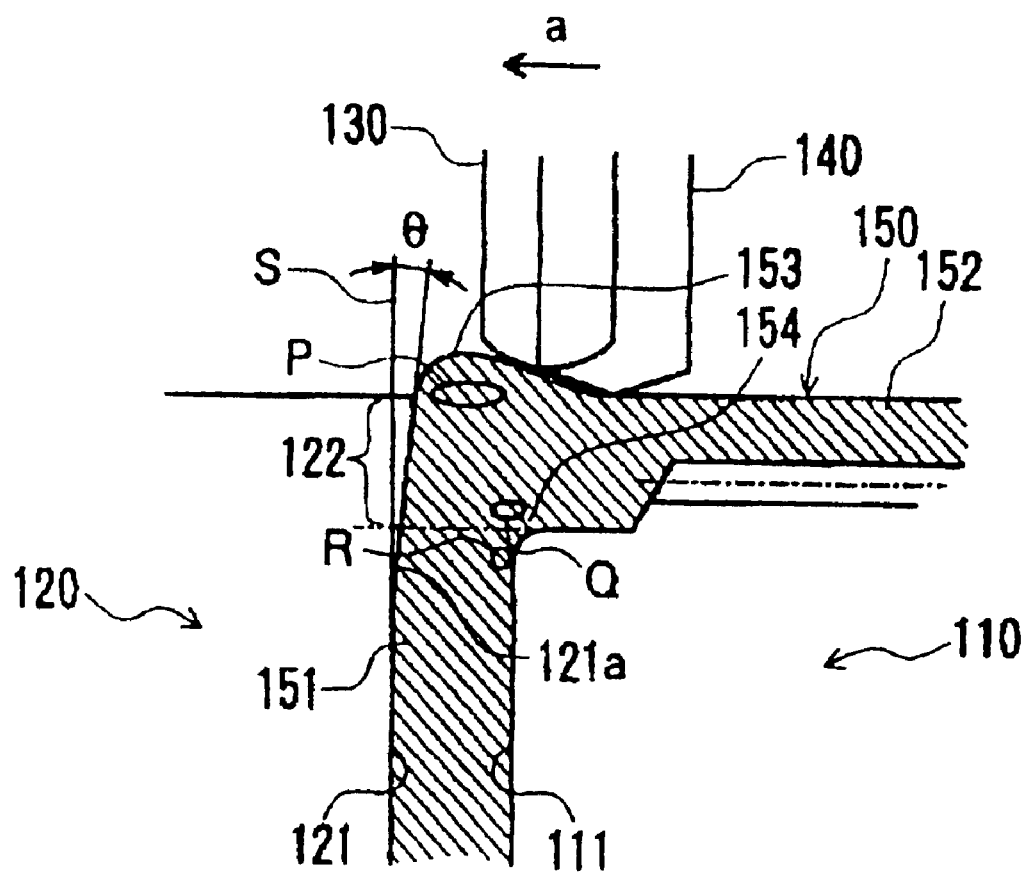
FIG. 22 is a longitudinal cross-sectional view of a portion near a shoulder portion of a cup-shaped member according to a fifth embodiment of the invention.

The fifth embodiment of the invention is shown in FIG. 22.

The fifth embodiment is characterized in that the holding surface 121 including the regulating portion 122 has a tapered portion 121a at its outer periphery.

This tapered portion 121a is formed such that the fixing means 120 projects from the plane S orthogonal to the central axis C (see FIG. 20) by an increased amount toward its outer periphery. For example, the tapered portion 121a has an angle θ of 3° to 5° from the plane S.

Regarding the material flow near the shoulder portion 153, this tapered portion 121a is capable of significantly suppressing the material flow near the forming rollers 130, 140 (the portion P in FIG. 22) and less significantly suppressing the material flow away from the forming rollers 130, 140 (the portion Q in FIG. 22). This allows further reduction in difference in flow rate of the material between outside (the portion Q) and inside (the portion R) of the root portion 154.

Thus, generation of the lap at the root portion 154 of the shoulder portion 153 can be prevented in a more favorable manner.

The angle θ of the tapered portion 121a is not limited to the aforementioned range of 3° to 5°, but may be set appropriately in view of the factors such as the flow property of the material and the traveling speed of the forming rollers 130, 140. Too large angle θ would reduce the strength of the shoulder portion 153.

(Sixth Embodiment)

Figure 23:
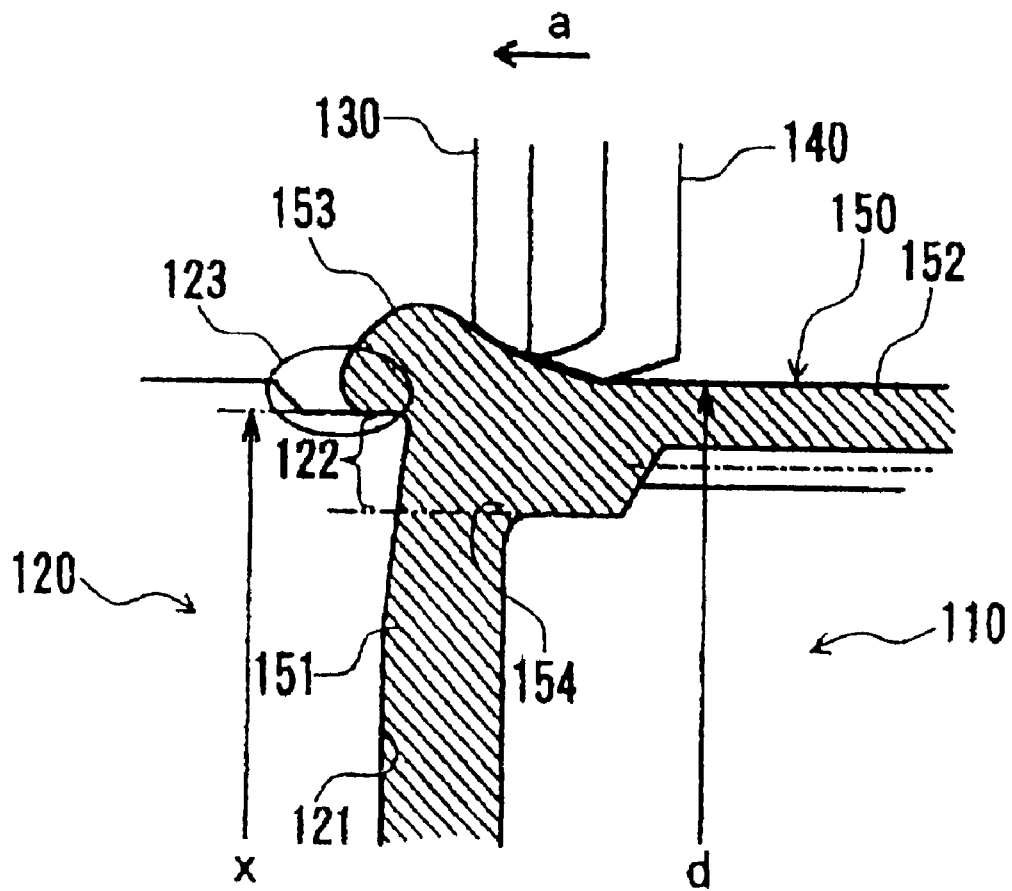
FIG. 23 is a longitudinal cross-sectional view of a portion near a shoulder portion of a cup-shaped member according to a sixth embodiment of the invention.

The sixth embodiment of the invention is shown in FIG. 23.

The sixth embodiment is characterized in that an escape portion 123 for the material is provided outside the regulating portion 122.

In order to provide the escape portion 123, the outer diameter x of the regulating portion 122 is set to a value smaller than the outer diameter d of the cylindrical portion 152 after formation with the forming rollers 130, 140. Thus, the material moved to the shoulder portion 153 by the forming rollers 130, 140 can partially escape into the escape portion 123, allowing reduction in processing loads in the thrust direction of the forming rollers 130, 140 (i.e., in the direction a).

Note that, even when the escape portion 123 is provided, it is preferable that the regulating portion 122 has as large radial width (vertical length in FIG. 23) as possible in order to prevent generation of the lap at the root portion 154. The dimension of the escape portion 123 and the width of the regulating portion 122 are set to an optimal value, for example, by experimentation in view of the factors such as the material and dimension of the cup-shaped member 150 and the traveling speed of the forming rollers 130, 140.

(Seventh Embodiment)

Figure 24:
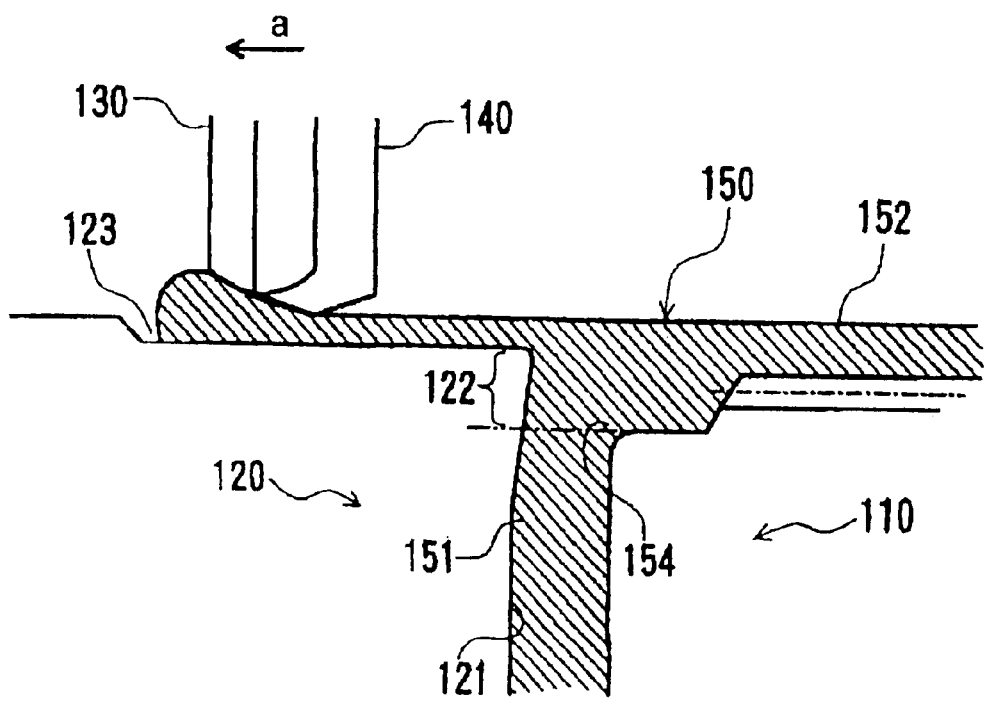
FIG. 24 is a longitudinal cross-sectional view of a portion near a shoulder portion of a cup-shaped member according to a seventh embodiment of the invention.

The seventh embodiment of the invention is shown in FIG. 24.

The seventh embodiment is characterized in that the escape portion 123 in the sixth embodiment is further extended in the traveling direction of the forming rollers 130, 140 in order to form the product having an H shape in cross section.

According to the embodiment, generation of the lap at the root portion 154 can be effectively prevented even in the product having an H shape in cross section.

(Eighth Embodiment)

Figure 25:
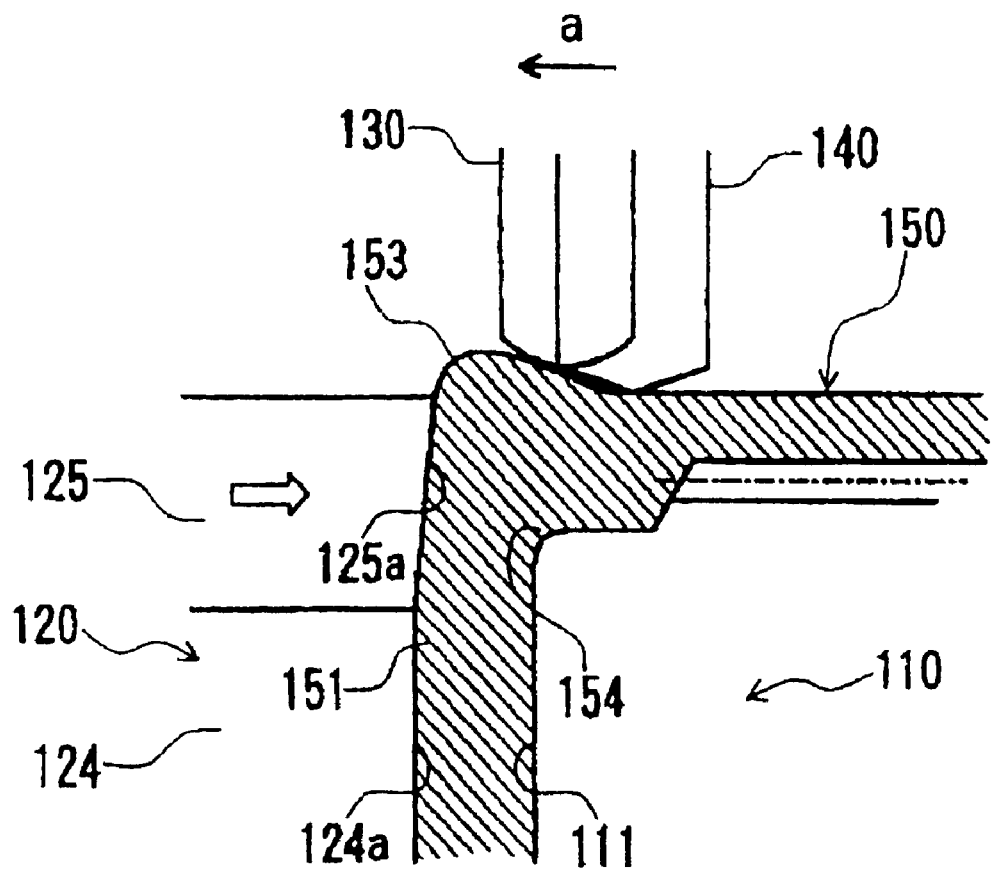
FIG. 25 is a longitudinal cross-sectional view of a portion near a shoulder portion of a cup-shaped member according to an eighth embodiment of the invention.

The eighth embodiment of the invention is shown in FIG. 25.

The eighth embodiment is characterized in that the fixing means 120 is divided into a fixed portion 124 and a movable portion 125.

More specifically, the fixing means 120 is divided into an inner fixed portion 124 and an annular movable portion 125 located outside the fixed portion 124. The fixed portion 124 has a first holding surface 124a, so that the radially inner portion of the bottom 151 of the cup-shaped member 150 is fixedly held between the first holding surface 124a and the end face 111 of the mandrel 110. The movable portion 125 has a second holding surface 125a for pressing with a predetermined pressure the radially outer portion of the bottom 151 of the cup-shaped member 150 against the end face 111 of the mandrel 110. The movable portion 125 is movable relative to the fixed portion 124 in the central-axis direction. For example, the pressing force of the movable portion 125 for pressing the bottom 151 is hydraulically controlled.

Figure 29:
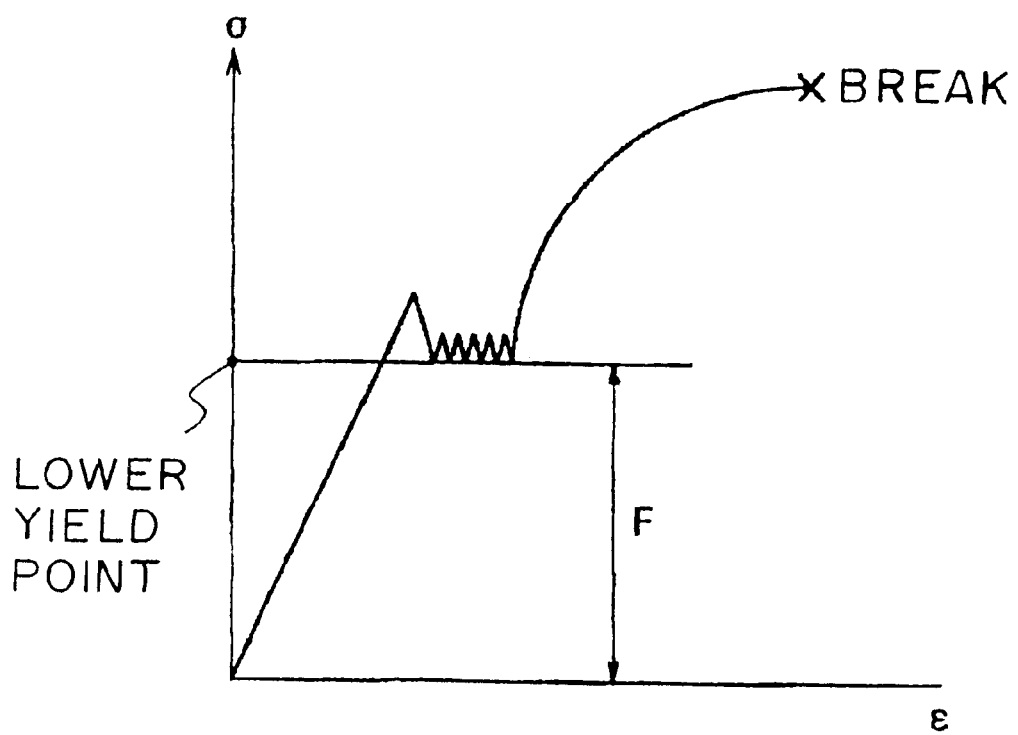
FIG. 29 is a stress-strain diagram showing the relation between the stress applied to a material and the strain.

With such a movable portion 125, the flow of the material moved to the shoulder portion 153 by the forming rollers 130, 140 can be controlled appropriately so as to prevent generation of the lap at the root portion 154. The control pressure of the movable portion 125 can be set based on the stress (σ)—strain (ε) diagram shown in FIG. 29. For example, the control voltage may be set to as large value as possible within the range F of the lower yield point or less in FIG. 29. Setting the control voltage as such makes the movable portion 125 flexible to the force received from the material. Thus, the regulations against the material flow inside the shoulder portion 154 shown in FIG. 25 are relieved, allowing reduction in difference in flow rate of the material between inside and outside of the shoulder portion 154. Accordingly, the lap is much less likely to be produced as compared to the case where the entire fixing member 120 has a fixed structure (the case in FIG. 22). Moreover, since the control voltage is set to a value equal to or less than the lower yield point, the bottom 151 of the cup-shaped member 151 will not unnecessarily be subjected to plastic deformation.

What is claimed is:

1. A method for manufacturing a cylindrical member from a blank, comprising the steps of:

providing a mandrel having a longitudinal axis, a face oriented perpendicular to the longitudinal axis, a cylindrical portion extending from the face approximately in parallel with the axis, and a tapered portion which extends axially away from the face and the cylindrical portion, with a radially increasing taper;

holding a radially inner portion of the blank against the face of the mandrel;

then, with the radially inner portion of the blank held against the face of the mandrel, bending the blank to bring an intermediate portion of the blank against the tapered portion of the mandrel; and partially thickening the bent blank by moving a thickening roller in a radially inward direction from the intermediate portion of the blank, toward the cylindrical portion, while pressing the blank, with the thickening roller, against the tapered portion of the mandrel.

2. The method according to claim 1, wherein the tapered portion intersects the cylindrical portion of the mandrel to define a corner and axially extends from the corner with the radially increasing taper.

3. The method according to claim 1, wherein tooth spaces for splining are formed in the cylindrical portion of the mandrel, and the cylindrical member is formed with inner splines by pressing the partially thickened portion of the blank into the tooth spaces.

4. The method according to claim 1, wherein the thickening roller has an outer peripheral surface tilted at a predetermined angle such that, when pressing the blank against the cylindrical portion of the mandrel, material of the blank in the columnar portion flows in a direction radially inward of the blank.

5. The method according to claim 1, further comprising a step of forming the blank by moving a forming roller in a relatively axial direction along the mandrel while pressing the blank, after the partially thickening step.

6. The method according to claim 5, wherein
the cylindrical portion and the tapered portion are integrally formed, and
the forming roller is moved along the cylindrical portion and the tapered portion so as to form the cylindrical member having an axially straight portion corresponding to the cylindrical portion and an enlarged diameter portion corresponding to the tapered portion.

7. The method according to claim 5, wherein
the mandrel includes a main body having the cylindrical portion, and a movable portion axially movable relative to the main body and having the tapered portion, and
in the thickening step, the movable portion is held at a position such that the blank abuts on the tapered portion of the mandrel, and in the forming step, the movable portion is moved to a position such that the blank does not abut on the movable portion, whereby the cylindrical member corresponding to the main body is formed.

8. The method according to claim 5, further comprising a step of pressing the portion thickened by the thickening step against the cylindrical portion of the mandrel by moving a pressing roller radially inward, the pressing step being conducted between the partially thickening step and the forming step.

9. An apparatus for manufacturing a cylindrical member from a blank, comprising:
a mandrel defining a longitudinal axis and including a face oriented perpendicular to the axis, a cylindrical portion extending from intersection with the face approximately in parallel with the axis, and a tapered portion that extends, with an increasing diameter, axially from a corner where it intersects the cylindrical portion;
a fixing member for holding the blank against the face of the mandrel; and
a thickening roller, movable in axial and radial directions relative to the mandrel, for pressing an intermediate tapered portion of the blank against the mandrel while moving in a radially inward direction from the intermediate portion of the blank to partially thicken the blank.

10. The apparatus according to claim 9, wherein teeth are formed on the cylindrical portion of the mandrel for forming interior splines in the thickened portion of the cylindrical member.

11. The apparatus according to claim 9, wherein the thickening roller has an outer peripheral surface tilted at a predetermined angle relative to the axis such that the thickening roller has a diameter which is reduced toward a portion of the blank that is held between the mandrel and the fixing member.

12. The apparatus according to claim 9, further comprising a forming roller movable axially of the mandrel while pressing the blank.

13. The apparatus according to claim 12, wherein
the cylindrical portion and the tapered portion of the mandrel are integrally formed.

14. The apparatus according to claim 12, wherein
the mandrel includes a main body having the cylindrical portion, and a movable portion movable in the axial direction relative to the main body and having the tapered portion, and the movable portion is movable between a position where the blank abuts the tapered portion during operation of the thickening roller, and a position where the blank does not abut the movable portion during operation of the forming roller.

15. The apparatus according to claim 12, further comprising a pressing roller for pressing the thickened portion against the cylindrical portion of the mandrel.

16. The apparatus according to claim 9, wherein the mandrel and the fixing member are rotatable and axially movable, and the thickening roller and the forming roller are axially movable relative to the mandrel.

17. The apparatus according to claim 16, further comprising a turret rotatable about an axis extending in parallel with the axis of the mandrel, wherein the thickening roller and the forming roller are supported in the turret, and the turret is rotatable to bring one of the thickening roller and the forming roller into a position facing the mandrel.

18. The apparatus according to claim 16, wherein the forming roller is composed of a plurality of different types of rollers including a rough roller and a finishing roller.

19. A method for manufacturing a cylindrical member from a blank by using a mandrel, the mandrel including a cylindrical portion and a tapered portion, the cylindrical portion extending approximately in parallel with an axis of the mandrel and having tooth spaces for splining formed at its outer peripheral surface, the method comprising a step of:
causing flow of material radially inward from an intermediate portion of the blank by moving, on the blank held by the mandrel, a thickening roller along the intermediate portion toward the columnar portion of the mandrel, while pressing the intermediate portion of the blank against the tapered portion of the mandrel, wherein the intermediate portion is located radially inward of an outer peripheral edge of the blank, while leaving a void between the blank and the mandrel at an intersection of the tapered portion with the cylindrical portion of the mandrel so that an underfill portion corresponding to the void is provided at a corner of the blank where the tapered portion and the cylindrical portion intersect.

20. The method according to claim 19, further comprising a step of pressing, in a radially inward direction, an outer peripheral surface of a cylindrical portion of the blank thickened by the thickening step by using a pressing roller, so as to force the material at an inner peripheral surface of the cylindrical portion of the blank into the tooth spaces, the pressing step being conducted after the thickening step.

21. The method according to claim 20, wherein the tooth spaces and the void are filled with the material in the pressing step.

22. The method according to claim 20, wherein the processing step leaves voids within the tooth spaces and at the intersection.

23. The method according to claim 22, further comprising a step of forming the blank by moving a forming roller axially along the cylindrical portion of the blank toward the corner while pressing an outer peripheral surface of the cylindrical portion of the blank in a radially inward direction in order to completely fill the tooth spaces and the intersection with the material, the forming step being conducted after the pressing step.

24. The method according to claim 20, wherein the tapered portion intersects the cylindrical portion of the mandrel to define a corner and axially extends from the corner with the radially increasing taper.

* * * * *